(12) United States Patent
Bradley et al.

(10) Patent No.: US 6,449,612 B1
(45) Date of Patent: Sep. 10, 2002

(54) VARYING CLUSTER NUMBER IN A SCALABLE CLUSTERING SYSTEM FOR USE WITH LARGE DATABASES

(75) Inventors: Paul S. Bradley, Seattle; Usama Fayyad, Mercer Island, both of WA (US)

(73) Assignee: Microsoft Corporation, Redmond, WA (US)

( * ) Notice: Subject to any disclaimer, the term of this patent is extended or adjusted under 35 U.S.C. 154(b) by 5 days.

(21) Appl. No.: 09/607,365

(22) Filed: Jun. 30, 2000

Related U.S. Application Data

(63) Continuation-in-part of application No. 09/083,906, filed on May 22, 1998, now Pat. No. 6,263,337, and a continuation-in-part of application No. 09/040,219, filed on Mar. 17, 1998.

(51) Int. Cl.[7] .................................................. G06F 7/04
(52) U.S. Cl. ...................... 707/6; 707/104.1; 707/201; 704/245
(58) Field of Search ............................ 707/6, 101, 102, 707/104.1, 201, 7; 704/5, 245, 243, 244; 709/106; 382/225, 226, 227

(56) References Cited

U.S. PATENT DOCUMENTS

| | | |
|---|---|---|
| 5,442,778 A | 8/1995 | Pedersen et al. |
| 5,687,364 A * | 11/1997 | Saund et al. ................. 704/5 |
| 5,758,147 A | 5/1998 | Chen et al. |
| 5,787,422 A | 7/1998 | Tukey et al. |
| 5,832,182 A | 11/1998 | Zhang et al. |
| 5,884,305 A | 3/1999 | Kleinberg et al. |
| 5,920,856 A | 7/1999 | Syeda-Mahmood |
| 5,930,784 A | 7/1999 | Hendrickson |
| 5,983,224 A | 11/1999 | Singh et al. |
| 6,003,029 A * | 12/1999 | Agrawal et al. ............... 707/7 |
| 6,012,058 A | 1/2000 | Fayyad et al. |
| 6,026,397 A * | 2/2000 | Sheppard ......................... 707/5 |
| 6,058,400 A * | 5/2000 | Slaughter ..................... 707/201 |
| 6,263,337 B1 * | 7/2001 | Fayyad et al. ................. 707/6 |
| 6,269,376 B1 * | 7/2001 | Dhillon et al. .............. 707/101 |
| 6,289,354 B1 * | 9/2001 | Aggarwal et al. ....... 707/104.1 |

OTHER PUBLICATIONS

J. Banfield and A. Raftery, "Model-based Gaussian and Non-Gaussian Clustering", Biometrics, vol. 39:803–821, pp.15–34, (1993).

(List continued on next page.)

*Primary Examiner*—Wayne Amsbury
*Assistant Examiner*—Thu-Thao Havan
(74) *Attorney, Agent, or Firm*—Watts, Hoffmann, Fisher & Heinke, Co., L.P.A.

(57) ABSTRACT

In one exemplary embodiment the invention provides a data mining system for use in finding cluster of data items in a database or any other data storage medium. A portion of the data in the database is read from a storage medium and brought into a rapid access memory buffer whose size is determined by the user or operating system depending on available memory resources. Data contained in the data buffer is used to update the original model data distributions in each of the K clusters in a clustering model. Some of the data belonging to a cluster is summarized or compressed and stored as a reduced form of the data representing sufficient statistics of the data. More data is accessed from the database and the models are updated. An updated set of parameters for the clusters is determined from the summarized data (sufficient statistics) and the newly acquired data. Stopping criteria are evaluated to determine if further data should be accessed from the database. Each time the data is read from the database, a holdout set of data is used to evaluate the model then current as well as other possible cluster models chosen from a candidate set of cluster models. The evaluation of the holdout data set allows a cluster model with a different cluster number K' to be chosen if that model more accurately models the data based upon the evaluation of the holdout set.

30 Claims, 7 Drawing Sheets

OTHER PUBLICATIONS

P.S. Bradley, O.I. Mangasarian, and W.N. Street. 1997. Clustering via Concave Minimization', in Advances in Neural Information Processing systems 9, M.C. Mozer, M.I. Jordan, and T. Petsche (Eds.) pp. 368–374, MIT Press, (1997).

P. Cheeseman and J. Stutz, "Bayesian Classification (AutoClass): Theory and Results", in [FPSU96], pp. 153–180. MIT Press, (1996).

A.P. Dempster, N.M. Laird, and D. Rubin, "Maximum Likelihood from Incomplete Data Via the EM Algorithm", Journal of the Royal Statistical Society, Series B, 39(1):pp. 1–38. (1977).

U. Fayyad, D. Haussler, and P. Stolorz. "Mining Science Data", Communications of the ACM 39(11), (1996).

D. Fisher, "Knowledge Acquisition via Incremental Conceptual Clustering". Machine Learning, 2:139–172, (1987).

E. Forgy, "Cluster Analysis for Multivariate Data: Efficiency vs. Interpretability of Classifications", Biometrics 21:768 (1965).

Jones, "A Note on Sampling from a Tape File", Communications of the ACM, vol. 5, (1962).

T. Zhang, R. Ramakrishnan, and M. Livny, "Birch: A New Data Clustering Algorithm and its Applications", Data Mining and Knowledge Discovery, vol. 1, No. 2, (1997).

Radford M. Neal and Geoffrey E. Hinton, A View of the EM Algorithm That Justifies Incremental, Sparse and Other Variants, (date unknown).

Bo Thiesson, Christopher Meek, David Maxcell Chickering and David Heckerman, "Learning Mixtures of DAG Models", Technical Report MSR-TR-97-30 De. 1997, revised May 1998.

S.Z. Selim and M.A. Ismail, "K–Means–Type Algorithms: A Generalized Covergence Therorem and Characterization of Local Optimaility," IEEE Trans. on Pattern Analysis and Machine Intelligence, vol. PAMI-6, No. 1, (1984).

* cited by examiner

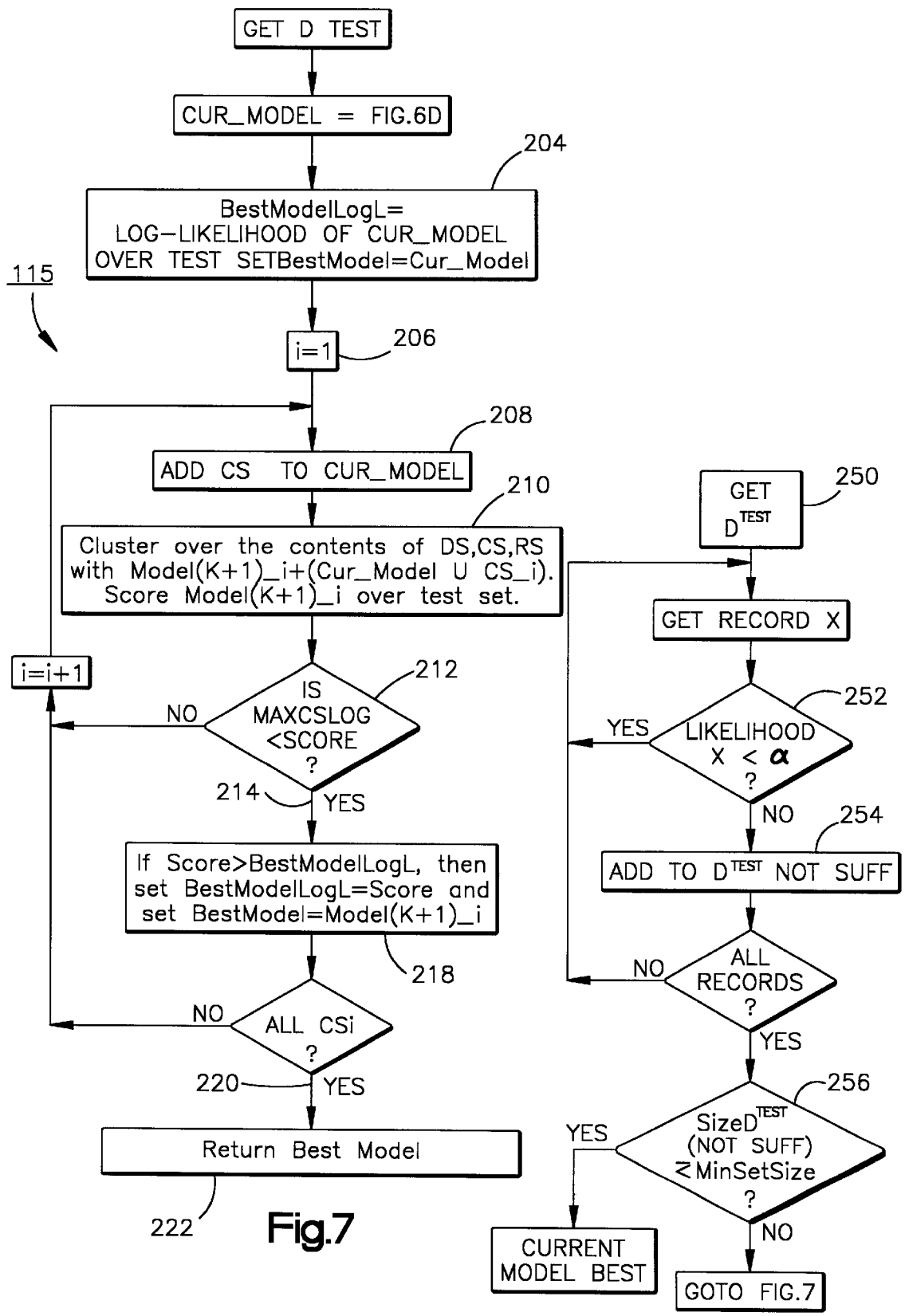

VARYING CLUSTER NUMBER IN A SCALABLE CLUSTERING SYSTEM FOR USE WITH LARGE DATABASES

CROSS REFERENCE TO RELATED APPLICATIONS

The present patent application is a continuation-in-part of United States Patent application entitled "A scalable system for Expectation Maximization clustering of large Databases", application Ser. No. 09/083,906 filed in the United States Patent and Trademark Office on May 22, 1998, now U.S. Pat. No. 6,263,337, and is also a continuation-in-part of United States Patent application entitled "A scalable system for clustering of large Databases", application Ser. No. 09/040,219 filed in the United States Patent and Trademark Office on Mar. 17, 1998, both of which are assigned to the assignee of the present application.

FIELD OF THE INVENTION

The present invention concerns database analysis and more particularly concerns apparatus and method for choosing a cluster number for use while clustering data into data groupings that characterize the data.

BACKGROUND ART

Large data sets are now commonly used in most business organizations. In fact, so much data has been gathered that asking even a simple question about the data has become a challenge. The modern information revolution is creating huge data stores which, instead of offering increased productivity and new opportunities, are threatening to drown the users in a flood of information. Accessing data in large databases for even simple browsing can result in an explosion of irrelevant and unimportant facts. Users who do not 'own' large databases face the overload problem when accessing databases on the Internet. A large challenge now facing the database community is how to sift through these databases to find useful information.

Existing database management systems (DBMS) perform the steps of reliably storing data and retrieving the data using a data access language, typically SQL. One major use of database technology is to help individuals and organizations make decisions and generate reports based on the data contained in the database.

An important class of problems in the areas of decision support and reporting are clustering (segmentation) problems where one is interested in finding groupings (clusters) in the data. Clustering has been studied for decades in statistics, pattern recognition, machine learning, and many other fields of science and engineering. However, implementations and applications have historically been limited to small data sets with a small number of dimensions or fields.

Each cluster includes records that are more similar to members of the same cluster than they are similar to rest of the data. For example, in a marketing application, a company may want to decide who to target for an ad campaign based on historical data about a set of customers and how the customers responded to previous ad campaigns. Other examples of such problems include: fraud detection, credit approval, diagnosis of system problems, diagnosis of manufacturing problems, recognition of event signatures, etc. Employing analysts (statisticians) to build cluster models is expensive, and often not effective for large problems (large data sets with large numbers of fields). Even trained scientists can fail in the quest for reliable clusters when the problem is high-dimensional (i.e. the data has many fields, say more than 20).

A goal of automated analysis of large databases is to extract useful information such as models or predictors from the data stored in the database. One of the primary operations in data mining is clustering (also known as database segmentation). Clustering is a necessary step in the mining of large databases as it represents a means for finding segments of the data that need to be modeled separately. This is an especially important consideration for large databases where a global model of the entire data typically makes no sense as data represents multiple populations that need to be modeled separately. Random sampling cannot help in deciding what the clusters are. Finally, clustering is an essential step if one needs to perform density estimation over the database (i.e. model the probability distribution governing the data source).

Applications of clustering are numerous and include the following broad areas: data mining, data analysis in general, data visualization, sampling, indexing, prediction, and compression. Specific applications in data mining including marketing, fraud detection (in credit cards, banking, and telecommunications), customer retention and churn minimization (in all sorts of services including airlines, telecommunication services, internet services, and web information services in general), direct marketing on the web and live marketing in Electronic Commerce.

Many clustering algorithms assume that the number of clusters (usually denoted by the integer K) is known prior to performing the clustering. These prior art clustering procedures then attempt to find a best way to partition the data into the K clusters. In the case where the number of clusters is not known before clustering is started, an outer evaluation loop can be employed which produces, for each value of K, a clustering solution with K clusters or partitions. This solution is then evaluated by a clustering criteria and the value of K producing the best results according to this criteria chosen for the clustering model.

The computational burden of applying this approach in the clustering of large-scale databases is very high. Given a database of even modest size, the time required for prior art clustering procedures to run for a fixed number of clusters K, can be many hours. Iterating over many values of K can result in days of computing to determine a best clustering model. In many real-world applications, the number of clusters residing in a given database is unknown and in many instances difficult to estimate. This is especially true if the number of fields or dimensions in the database is large.

SUMMARY OF THE INVENTION

The present invention determines a cluster number K using an incremental process that is integrated with a scalable clustering process particularly suited for clustering large databases. The invention allows for an adjustment of the cluster number K during the clustering process without rescanning data from the database. Unlike prior art looping processes the computational complexity added by the exemplary choice of K process is not unduly burdensome.

A process performed in accordance with the invention starts with an existing cluster number K and explores the suitability of other cluster numbers differing slightly from K using a test set of data obtained from the database. A good estimate of the number of true clusters that are contained in the database is found, even though an initial choice of the cluster number K is not optimal.

A computer system operating in accordance with an exemplary embodiment of the invention computes a candidate cluster set for characterizing a database of data stored on a storage medium. The candidate cluster set includes two or more clustering models that have different number of casters in their model. A data portion is obtained from the database and it is then used to determine the fit of data to each clustering model within the candidate cluster set. The clustering model best fitting the test data is chosen as the optimal clustering model from the candidate cluster set. The cluster number from the selected clustering model is used to update the clustering model output by the computer. Other data ports are obtained from the database and the process of updating the cluster model continues. This updating uses the newly sampled data from the database and sufficient statistics stored in memory derived from other data gathering steps until a specified clustering criteria has been satisfied.

The process of updating the clustering number is based on evaluating a holdout (test) data set to determine if one of the candidate set of cluster models fits the data from the holdout (test) set better than the current model. The holdout data set is read from the database. It can either be used exclusively for cluster number evaluation or it can be used to create a cluster model after it has been used to determine an appropriate model.

The sufficient statistics are maintained in a computer buffer and represent data from the database used in creating a current clustering model. In accordance with one embodiment of the invention, clusters that make up a current clustering model are evaluated as candidate clusters for removal from the current clustering model. This reduces the cluster number. The candidate clustering model (having reduced cluster number) is used to recluster the data from the sufficient statistics stored in a computer buffer. The fit of the data in the holdout (test) set is then compared with the fit from the current clustering model if the holdout data set fits the candidate clustering model better than the current model, the cluster number is reduced.

The sufficient statistics summarizes a number of data subclusters. In an alternate embodiment of the invention these subclusters serve as potential additional clusters that will increase the cluster number of the current clustering model. A candidate cluster model is formed by adding one or more subclusters to the current model and reclustering the data using the sufficient statistics in the computer buffer. The resulting candidate cluster model is used to evaluate the fit of the holdout data set. If the candidate clustering model better fits the data then the candidate clustering model (having larger cluster number) becomes the current clustering model for use in further clustering.

These and other objects advantages and features of the present invention are described in more detail below in conjunction with the accompanying drawings.

BRIEF DESCRIPTION OF THE DRAWINGS

FIG. 7 is a flowchart of a subroutine for use in determining cluster number in accordance with an exemplary embodiment of the present invention;

FIG. 8 is a flow chart of an alternative embodiment of a subroutine for use in

DETAILED DESCRIPTION OF THE EXEMPLARY EMBODIMENT OF THE INVENTION

The present invention has particular utility for use in characterizing data contained in a database 10 (FIG. 2) having many records stored on multiple, possibly distributed storage devices. Each record has many attributes or fields which for a representative database might include age, income, number of children, type of car owned etc. A goal of the invention is to use a cluster number that optimizes the accuracy of the cluster model produced during clustering. In accordance with the present invention, the data from the database 10 is brought into a memory 22 (FIG. 1) of the computer system 20 and an output model is created from the data by a data mining engine 12. (FIG. 2) In a client/server implementation an application program acts as the client and the data mining engine is the server. The application is the recipient of an output model and makes use of that model in one of a number of possible ways such as fraud detection etc.

In so-called K-means clustering the data points from a database belong or are assigned to a single cluster. A process for evaluating a database using the K-means process is describing in our copending United States patent application entitled "A scalable method for K-means clustering of large Databases", U.S. application Ser. No. 09/042,540 filed in the United States Patent and Trademark Office on Mar. 17, 1998, which is assigned to the assignee of the present application and is also incorporated herein by reference.

In an expectation maximization (EM) clustering analysis, rather than assigning each data point to a cluster and then calculating the mean or average of that cluster, each data point has a probability or weighting factor for each of the K clusters that characterize the data. For the EM analysis used in conjunction with an exemplary embodiment of the present invention, one associates a Gaussian distribution of data about the centroid of each of the K clusters of the clustering model. A process for evaluating a database using the EM process is describing in our copending United States patent application entitled "A scalable system for Expectation Maximization clustering of large Databases", U.S. application Ser. No. 09/083,906 filed in the United States Patent and Trademark Office on May 22, 1998, which is assigned to the assignee of the present application and is also incorporated herein by reference.

Figure 5:
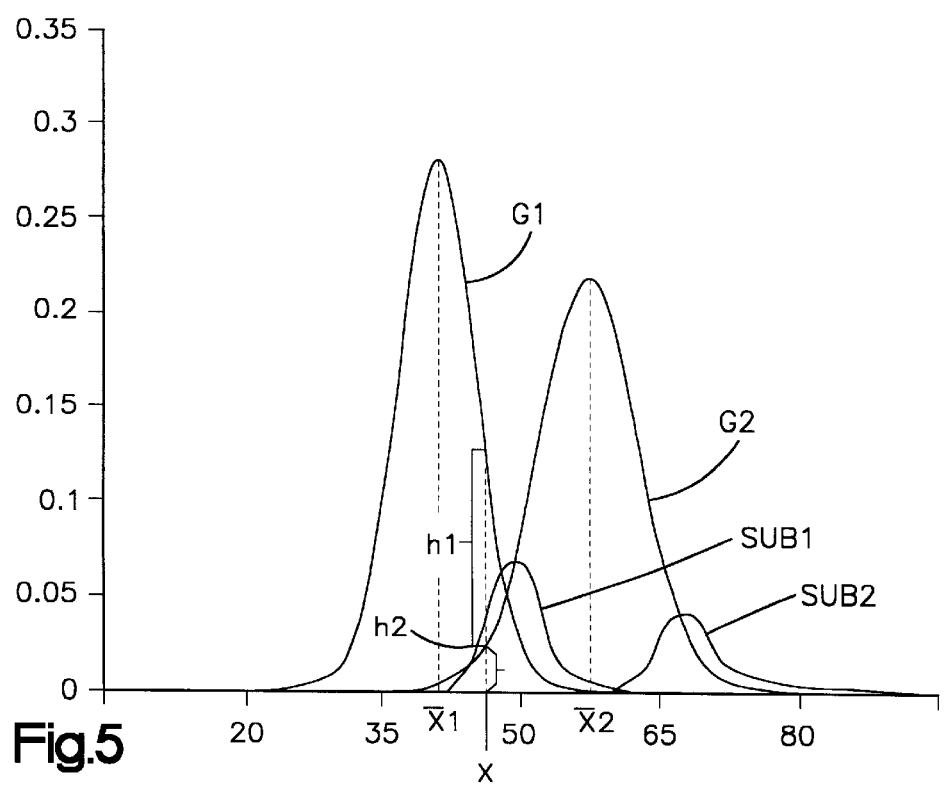
FIG. 5 is a one-dimensional plot of a data distribution of two data clusters illustrating how a data point is assigned to each cluster.

FIG. 5 is a one dimensional depiction of two Gaussians G1, G2 representing data clusters that have centroids or means of $\overline{x}^1, \overline{x}^2$. The compactness of the data within a cluster is generally indicated by the shape of the Gaussian and the average value of the cluster is given by the mean. Consider the data point identified along the axis as the point "X." This data point 'belongs' to both the clusters identified by the Gaussians G1, G2. This data point 'belongs' to the Gaussian G2 with a weighting factor proportional to h2 (probability density value) that is given by the vertical distance from the horizontal axis to the curve G2. The data point X 'belongs' to the cluster characterized by the Gaussian G1 with a weighting factor proportion to h1 given by the vertical distance from the horizontal axis to the Gaussian G1. We say that the data point X belongs fractionally to both clusters. The weighting factor of its membership to G1 is given by (fraction of points represented by G1)*h1/(fraction of points represented by G1)*h1+(fraction of points represented by G2)*h2+(fraction of points represented by rest)*Hrest); similarly it belongs to G2 with weight (fraction of the points by G2)*h2/((fraction of points represented by G1)*h1+ (fraction of points represented by G2)*h2+(fraction of points represented by rest)*Hrest). Hrest is the sum of the heights of the curves for all other clusters (Gaussians). If the height of the data point in other clusters is negligible one can think of a "portion" of the case belonging to cluster 1 (represented by G1) while the rest belongs to cluster 2 (represented by G2). For example, if the fraction of points represented by G1 is 0.5, h1=0.13, the fraction of points represented by G2=0.49 and h2=0.03, then ((0.5)(0.13))/ ((0.5)*(0.13)+(0.49)*(0.03))=0.8156 of the data point belongs to cluster 1, while 0.1844 of the data point belongs to cluster 2. Similar computations are made when computing the membership of a data record having continuous and discrete attributes in a given cluster. The continuous attributes are modeled by a Gaussian distribution while the discrete attributes are modeled by Multinomial distributions. The "heights" in the discussion above are then generalized to the probability of membership of the data point in each cluster (i.e. height of the Gaussian times the probability of each discrete attribute value in the corresponding Multinomial distributions).

Consider the records from Table 1 which constitutes recent records read from the database. Each record has three discrete attributes of 'color', 'style' and 'sex' and continuous attributes of 'income' and 'age'. Note, that record #2 indicates that a female purchased a blue sedan and that she has an income of 46K and an age of 47 years.

TABLE 1

| RecordID | Color | Style | Sex | Income | Age |
| --- | --- | --- | --- | --- | --- |
| 1 | yellow | sedan | male | 24K | 32 yrs |
| 2 | blue | sedan | female | 46K | 47 |
| 3 | green | sedan | male | 82K | 66 |
| 4 | white | truck | male | 40K | 30 |
| 5 | yellow | sport | female | 38K | 39 |

For each of the records of Table 1 the data mining engine 12 must compute the probability of membership of each data record in each of the K clusters. Suppose, in the general case, the discrete attributes are labeled "DiscAtt#1", "DiscAtt#2", . . . , "DiscAtt#d" and let the remaining continuous attributes make up a numerical vector x. The notation for determining this probability is:

Prob(record|cluster #)=p(DiscAtt#1|cluster #)*p (DiscAtt#2|cluster #) * . . . *p(DiscAtt#d|cluster #)* p(x|$\mu$,$\Sigma$ of cluster #). Here p(DiscAttr#j|cluster #) is computed by looking up the stored probability of DiscAttr#j in the given cluster (i.e. reading the current probability from the attribute/value probability table associated with this cluster). p(x|$\mu$,$\Sigma$ of cluster #) is calculated by computing the value of x under a normal distribution with mean $\mu$ and covariance matrix $\Sigma$:

$$p(x \mid \mu, \Sigma \text{ of cluster\#}) = \frac{1}{(2\pi)^{n/2}\sqrt{|\Sigma|}} \exp\left\{1\frac{1}{2}(x-\mu)^T \left(\sum\right)^{-1}(x-\mu)\right\}$$

When performing an expectation maximization (EM) clustering analysis such as an analysis described in the Fayyad et al parent patent application Ser. No. 09/083,906, each data point is assigned to each of the K clusters with a probability or weighting factor. For example, if all the attributes of data records in the database are ordered, then each cluster has a mean and a covariance matrix of a dimension equal to the number of attributes in the data record. For a data record having n ordered dimensions, the resulting covariance matrix is an n×n matrix.

If the EM analysis is used in conjunction with an exemplary embodiment of the present invention, one associates a Gaussian distribution of data about the centroid of each of the K clusters for the ordered dimensions. For each of the data record (having mixed discrete and ordered attributes) a weight factor is similarly determined indicating the degree of membership of this data record in a given cluster. In our example with 3 clusters, the weightings are determined by:

Weight in cluster 1=P(record|cluster 1)/[P(record|cluster 1)+P(record|cluster 2)+P(record|cluster 3)]. Weight in cluster 2=P(record|cluster 2)/[P(record|cluster 1)+P (record|cluster 2)+P(record|cluster 3)]. Weight in cluster 3 =P(record|cluster 3)/([P(record|cluster 1)+P (record|cluster 2)+P(record|cluster 3)]. Here P(record|cluster #) is given as above.

Overview of Scalable Clustering

Figure 3:
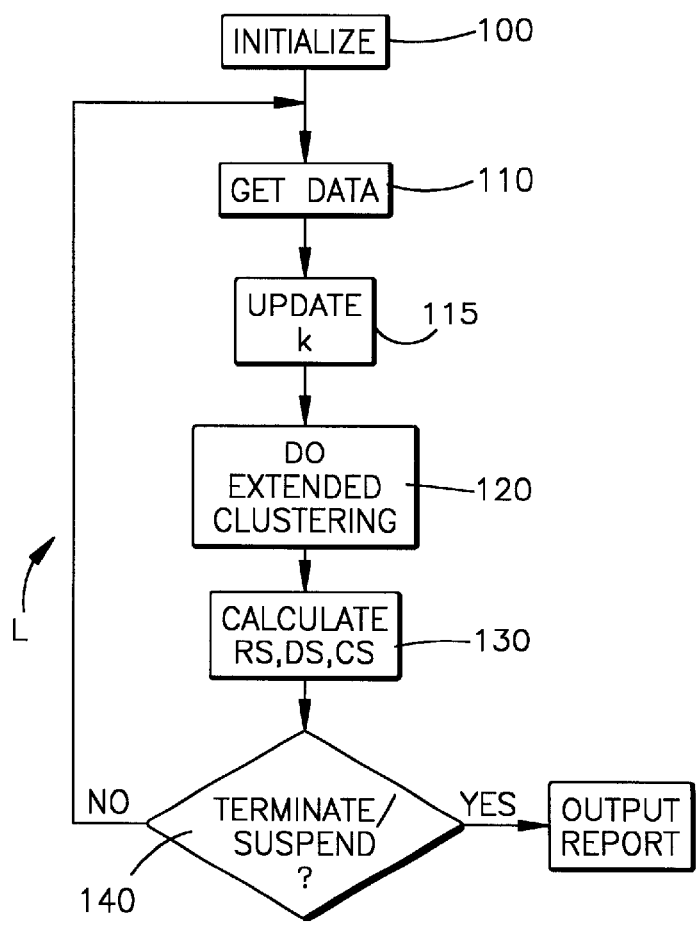
FIG. 3 is a flow diagram of a scalable clustering process for use with an exemplary embodiment of the invention.

FIG. 3 is a flow chart of the process steps performed during a scalable clustering analysis of data. An initialization step 100 sets up the data structures shown in FIGS. 6A–6D and begs with a cluster number K (possibly based upon a user input via a keyboard 40) for the characterizing data.

Figure 1:
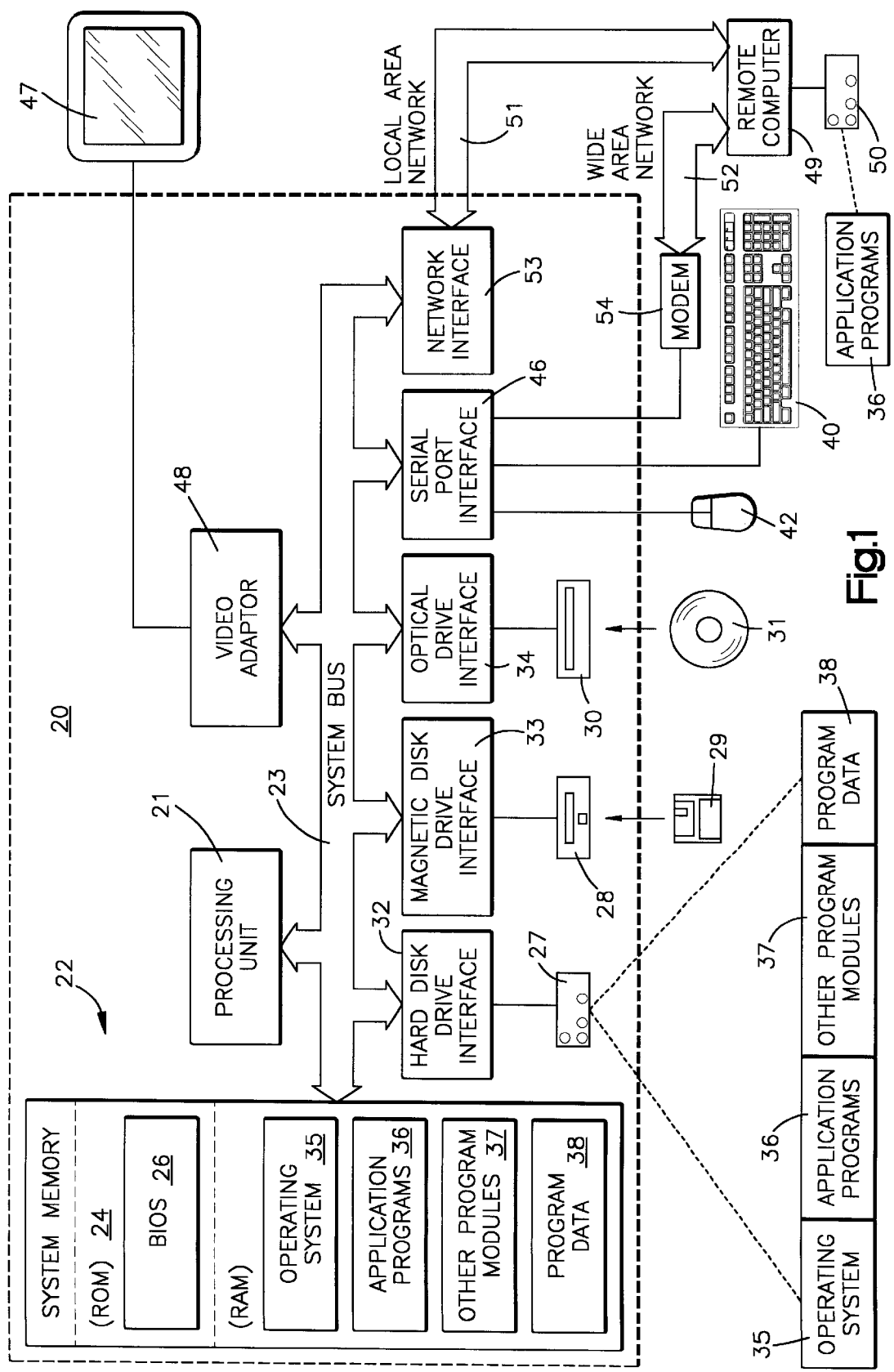
FIG. 1 is a schematic illustration of a computer system for use in practicing the present invention.
Figure 2:
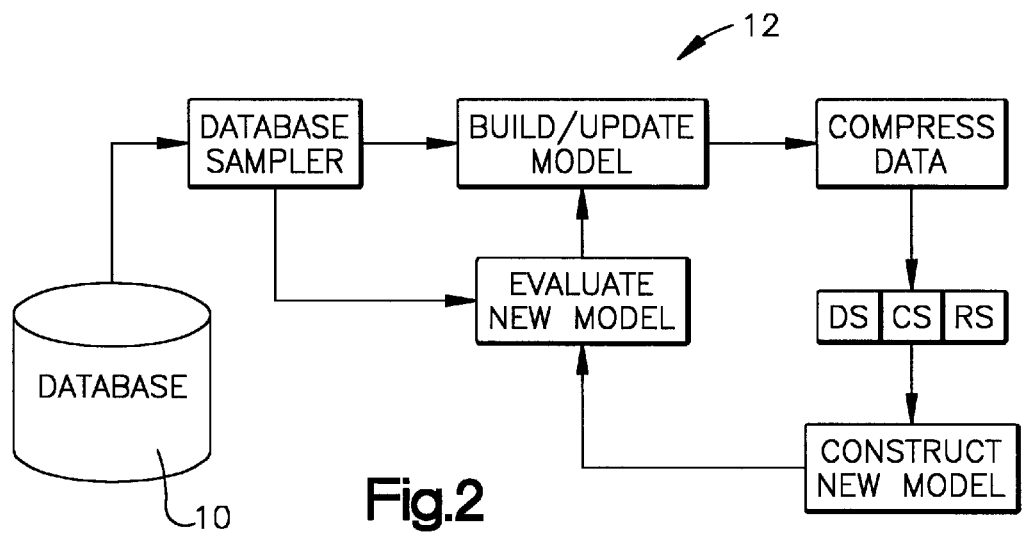
FIG. 2 is schematic depiction of a clustering system.

A next step 110 is to sample portion of the data in the base 10 from a storage medium to bring that portion of data within a rapid access memory (into RAM for example, although other forms of rapid access memory are contemplated) of the computer 20 schematically depicted in FIG. 1. In general, the data has a large number of fields so that instead of a single dimension analysis, the invention characterizes a large number of vectors where the dimension of the vector is the number of attributes of the data records in the database. A data structure 180 for this data is shown in FIG. 6C to include a number r of records having a potentially large number of attributes.

The gathering of data can be performed using either a sequential scan that uses only a forward pointer to sequentially traverse the data or an indexed scan that provides a random sampling of data from the database. It is preferable in the index scan that data not be accessed multiple times. This requires a sampling without duplication mechanism for marking data records to avoid duplicates, or a random index generator that does not repeat. In particular, it is most preferable that the first iteration of sampling data be done randomly. If it is known the data is random within the database then sequential scanning is acceptable and will result in best performance as the scan cost is minimized. If it is not known that the data is randomly distributed, then random sampling is needed to avoid an inaccurate representative of the database.

Figure 6A:
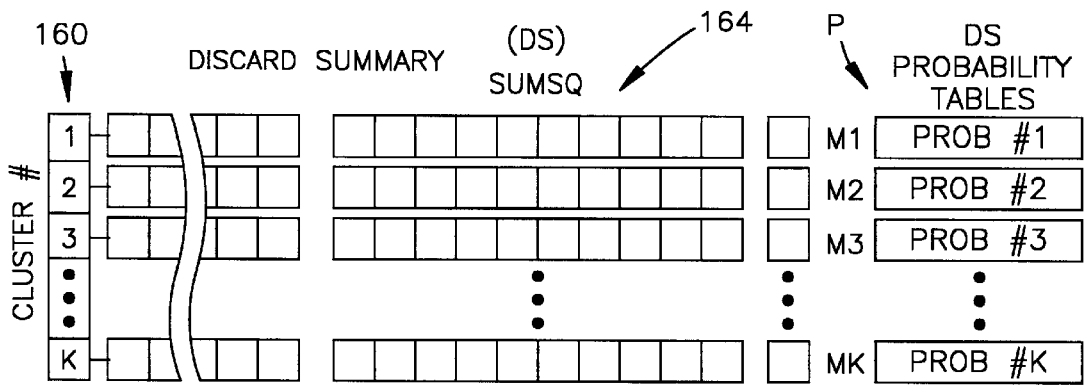
FIGS. 6A–6D are illustrations of data structures utilized for storing data in accordance with the exemplary embodiment of the invention.
Figure 6B:
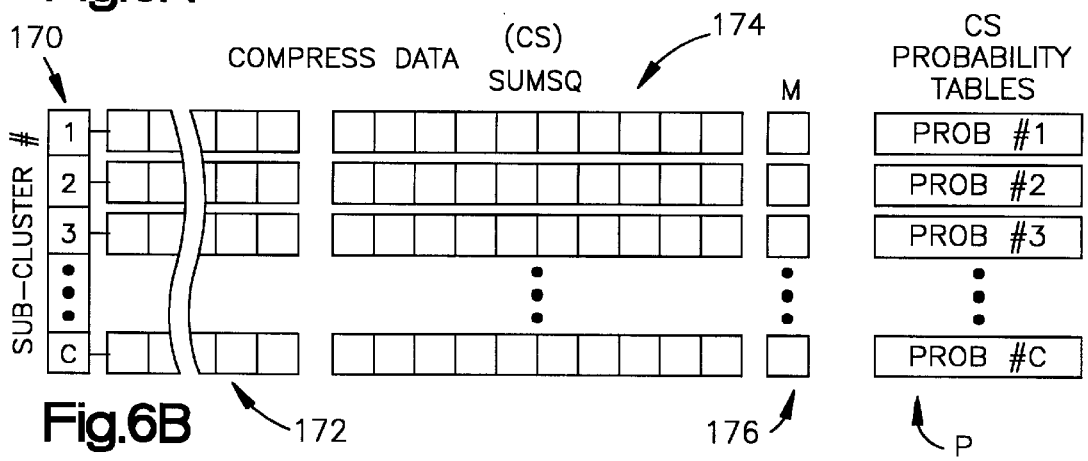

At the start of a first iteration of a processing loop L (FIG. 3) no meaningful clustering model exists. This model is created at a step 120 wherein a processor unit 21 of the computer system 20 performs an extended clustering analysis of a portion of the data brought into memory. The term 'extended' is used to distinguish the disclosed process from a prior art clustering analysis. Classical (prior art) clustering operates on data records. The disclosed extended implementation works over a mix of data records and sufficient statistics representing sets of data records. The processor 21 evaluates the data brought into memory and iteratively determines a model of that data for each of the K clusters. A data structure for the results or output model of the extended EM analysis is depicted in FIG. 6D.

Figure 6C:
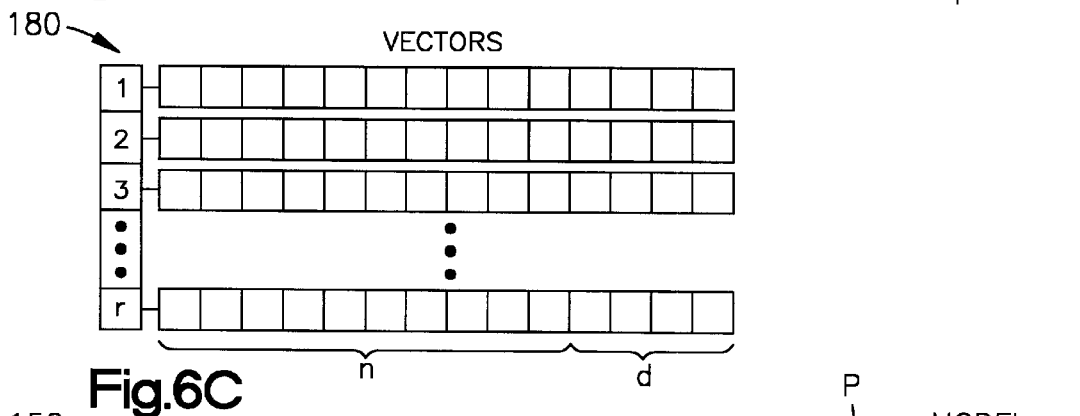
Figure 6D:
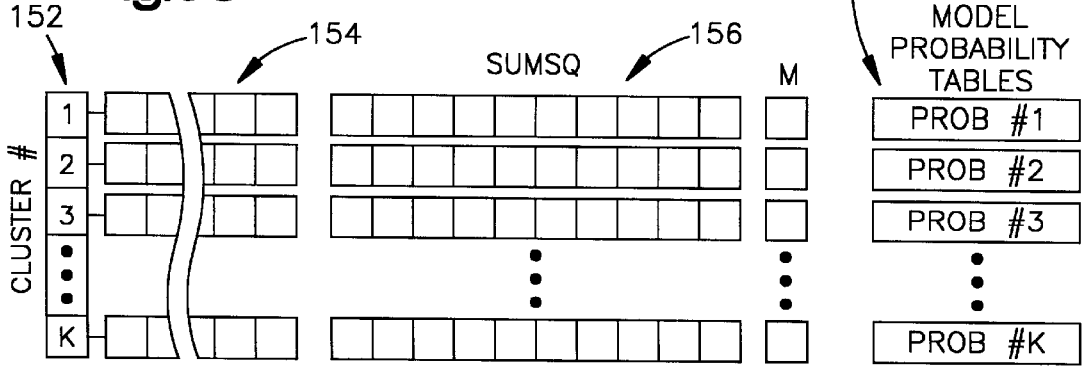

On subsequent iterations of the FIG. 3 processing loop L a holdout data set mantained as individual data records such as those found in FIG. 6C is used to evaluate the model for the sufficiency of the cluster number K. The holdout data set can, for example, be a portion of the data gathered at the step 110 but not used in updating the cluster model during the step 120. Details of a step 115 for updating the cluster number are described in more detail below wherein alternative embodiments of a cluster number adjustment process are described.

During the next processing step 130 in the FIG. 3 flowchart some of the data used in the present loop iteration to model the K clusters is summarized and compressed. This summarization is contained in the data structures of FIGS. 6A and 6B which take up significantly less storage in the memory 25 than the vector data structure needed to store individual records FIG. 6C). Storing a summarization of the data in the data structures of FIGS. 6B and 6C frees up more memory allowing additional data to be sampled from the database 10. Additional iterations of the extended clustering analysis are performed on this data.

Before looping back to get more data at the step 110 the processor 21 determines 140 whether a stop criteria has been reached. One stopping criterion is whether the clustering analysis is good enough by a standard that is described below. A second alternative stopping criterion has been reached if all the data in the database has been used in the analysis. Instead of stopping the analysis, the analysis can be suspended. Data in the data structures of FIGS. 6A–6D can be saved, along with the location of the database cursor (either in memory or to disk) and the extended clustering process can then be resumed later. This allows the database to be updated and the analysis resumed to update the EM analysis without starting from the beginning. It also allows another process to take control of the processor 21 without losing the state of the analysis. Such a suspension could also be initiated in response to a user request that the analysis be suspended by means of a user actuated control on an interface presented to the user on a monitor 47 while the EM analysis is being performed.

Data Structures

Data structures used during the performance of the extended EM analysis are found in FIGS. 6A–6D. An output or result FIG. 6D)) of the clustering analysis is a data structure which includes an array 152 of pointers. Each of the K pointers points to a vector 154 of n elements (floats) designated 'SUM', a second vector 156 of n elements (floats) designated 'SUMSQ', a single floating point number 158 designated 'M', and an attribute/value probability table P. The number M represents the number of database records represented by a given cluster. The MODEL includes K entries, one for each cluster.

The vector 'SUM' represents the sum of the weighted contribution of each database record that has been read in from the database. As an example a typical record will have a value of the ith dimension which contributes to each of the K clusters. Therefore the ith dimension of that record contributes a weighted component to each of the K sum vectors. A second vector 'Sumsq' is the sum of the squared components of each record which corresponds to the diagonal elements of the so-called covariance matrix. In a general case the diagonal matrix could be a full n×n matrix. It is assumed for the disclosed exemplary embodiment that the off diagonal elements are zero. However, this assumption is not necessary and a full covariance matrix may be used. A third component of the model is a floating point number 'M'. The number 'M' is determined by totaling the weighting factor for a given cluster k over all data points and dividing by the number of points. The mean (center) and covariance (spread) of the data in a cluster K is computed from the model output from the clustering process. The attribute value probability table P has a row for each discrete attribute in the database and column for each value of the corresponding attribute. Entries in the table correspond to the probability of observing the given value (indicated by the column of the entry) for the given attribute (indicated by the row of the given attribute).

An additional data structure designated DS in FIG. 6A includes an array of pointers 160 that point to a group of K vectors (the cluster number) of n elements 162 designated 'SUM', a second group of K vectors 164 designated 'SUMSQ', a group of K floats 166 designated M, and a set of K attribute/value probability tables denote P. This data structure is similar to the data structure of FIG. 6D that describes the MODEL. It contains sufficient statics for a number of data records that have been compressed into the data structure of FIG. 6A rather than maintained in memory. Compression of the data into this data structure and the CS data structure described below frees up memory for accessing other data from the database at the step 110 on a next subsequent iteration of the FIG. 3 scalable clustering process.

A further data structure designated CS in FIG. 6B is an array 170 of c pointers were each pointer points to an element which consists of a vector of n elements 172 (floats) designated 'SUM', a vector of n elements 174 (floats) designated 'SUMSQ', a scalar 'M' 176, and an attribute/value probability table P. The data structure CS also represents multiple data points that are compressed into a vector similar to the MODEL data structure.

A data structure designated RS (FIG. 6C) is a group of r vectors having n dimensions. Each of the vectors has (n+d) elements (floats) representing a singleton data point. The singleton data points consists of n continuous attributes and d discrete attributes. As data is read in from the database at the step 110 it is initially stored in the set RS since this data is not associated with any cluster. The current implementation of the extended EM analysis, RS is a vector of pointers to elements of type SDATA of the same length as the 'SUM' vector of the other data structures and a 'SUMSQ' vector is simply null, M=1, and the attribute/value probability table simply contains an entry of 1.0 corresponding to the given attribute and value, the rest of the table entries are 0.0. Recall that the attribute determines the row of the entry and the value determines the entry Perturbation Data Compression Freeing up memory so that more data from the database can be accessed is accomplished by compressing data and storing sufficient statistics for compressed data in the memory thereby freeing up memory for the gathering of more data from the database. For each of the K clusters a confidence interval on the Gaussian mean is defined for each of the continuous attributes and a confidence interval is defined for each value in the attribute/value probability table for the discrete attributes. Appendix A describes one process for setting up a confidence interval on the multidimensional Gaussian means associated with the continuous attributes of the K clusters.

Consider the example of five attributes of color, style, sex, income and age from table 3. For the discrete attributes such as color, the model (FIG. 8D) includes probabilities for each attribute value (See FIG. 9A) in the range of between 0.0 and 1.0. When which of the data records can safely be compressed the data mining engine 12 sets up a confidence interval that brackets these probabilities

| For color: | | | |
|---|---|---|---|
| Red | Blue | Green | White |
| .1+/−.005 | .2+/−.005 | .5+/−.01 | .2+/−.008 |
| For Style: | | | |
| Sedan | sport | truck | |
| 5+/−.007 | .4+/−.003 | .1+/−.002 | |
| For sex: | | | |
| Male | Female | | |
| .3+/−.05 | .7+/−.05 | | |

Confidence intervals are also set up for the continuous attributes for each of the clusters. Assume that for cluster #1 the mean income attribute is $40,000 and the confidence interval is $1500 above and below this value. The age attribute confidence interval for cluster #1 is 45 yrs+/−2.

Now consider the second data record. As calculated above, this data record was assigned to cluster #1 with highest probability of membership. The perturbation technique determines whether to compress a record into the DS data structure (FIG. 6A) by adjusting the probabilities of the cluster to which the record is assigned so that the probability of membership in this "adjusted" cluster is decreased (lowers the attribute/value probabilities within the confidence interval for the discrete attributes and shifts the cluster mean away from the data record for the continuous attributes) and adjusts the probabilities and means of the clusters to which the data record is not assigned so that the probability of membership in these "adjusted" clusters is increased by raising the attribute/value probabilities and shifting the mean toward the data record for the continuous attributes. This process maximizes the possibilities that the RecordID #2 will be assigned to a different cluster with highest probability of membership.

With these temporary adjustments, the calculations for the data record membership are again performed. If the data record (RecordID #2) does not change cluster membership (maximum probability of cluster membership is the original cluster) the sufficient statistics for this data record can be safely added to the DS data structure in FIG. 6A. The adjusted attribute/value probabilities and cluster means are returned to the original state.

Assume Record Id #2 is compressed at this stage. The record is removed from the RS list of records, and its attribute values are used to form the sufficient statistics contained in the set DS associated with the cluster with highest probability of membership of RecordID#2. The DS data structure consists of Gaussian sufficient statistics (Sum, Sumsq, M) summarizing the values of continuous attributes and an attribute/value probability table summarizing the values of the discrete attributes (See FIG. 8A). The processing step 130 visits each record, attempts to compress that record and if the record can be compressed the vectors of SUM, SUMSQ, and M and the attribute/value probability tables P are all updated. The tables P associated with the DS and CS data structures now contain sufficient statistics for compressed records that are removed from

Thresholding Data Compression

A second data compression process is called thresholding. One can sort all the data points falling within a given cluster based on the probability assigned to them i.e. (fraction of data points represented by cluster $1)*p(discrete_{r1}|cluster$ $\#1)*p(discrete_{r2}|cluster\ 1)* \ldots p(descrete_{rd}|cluster\ \#1)*p$ (continuous,$|\mu,\Sigma$ of cluster #1) and choose for compression into the DS dataset the data points having the highest probability of membership. An additional alternate threshold process would be to take all the data points assigned to a cluster and compress into DS all the data points where the product of the probabilities is greater than a threshold value.

Subclustering

The subclustering is done after all possible data records have been compressed into the DS data structure. The remaining candidates for summarization into the CS data structures (FIG. 6B) are first filtered to see if they are sufficiently "close" to an existing CS subcluster or, equivalently their probability of membership in an existing CS subcluster is sufficiently high. If not, a clustering is performed using random starting conditions. Subclusters lacking a requisite number of data points are put back in RS and the remaining subclusters are merged.

Assume that the set RS (FIG. 8C) consists of singleton data points and the compressed points have been removed from the RS dataset and have been summarized in the DS data set, contributing to the values of Sum, Sumsq, M, and the attribute/value probability table in the DS structure. Let m be the number of singleton data elements left in RS. Set CS_New=empty. Set k' to be number of subcluster candidates to search for. Randomly choose k' elements from RS to use as an initial starting point for a classic EM clustering. Run classic EM with harsh assignments over the data remaining in RS with the initial point. Harsh assignments in classic EM can be accomplished by assigning a data record with weight 1.0 to the subcluster with highest probability of membership. This procedure will determine k' candidate subclusters. Set up a new data structure CS_New to contain the set of sufficient statistics, including attribute/value probability tables for the k' candidate subclusters deter in this manner. For each set of sufficient statistics in CS_New, if the number of data points represented by these sufficient statistics is below a given threshold, remove the set of sufficient statistics from CS_New and leave the data points generating these sufficient statistics in RS.

For each set of sufficient statistics in CS_New remaining, if the maximum standard deviation along any continuous dimension of the corresponding candidate subcluster is greater than a threshold β, or the maximum standard deviation of an entry in the attribute/value probability table is greater than β/2 (β in the range [0,1]), remove the set of sufficient statistics from CS_New and keep the data points generating these sufficient statistics in RS. The value of β/2 is derived as follows: the standard deviation of a probability p is sqrt(p*1.0−p). This value is maximized when p=0.5 in which case sqrt(p*1.0−p))=sqrt(0.25)=0.5. Hence, in the worst case, the standard devation is 0.5. Since β takes values between [0,1], we threshold the standard deviation of the probability by β/2.

Set CS_Temp=CS_New ∪ CS. Augment the set of previously computed sufficient statistics CS with the new ones surviving the filtering in steps 6 and 7. For each set of sufficient statistics s (corresponding to a sub cluster) in CS_Temp Determine the s', the set of sufficient statistics in CS_Temp with highest probability of membership in the subcluster represented by s. If the subcluster formed by merging s and s', denoted by merge(s, s') is such that the maximum standard deviation along any dimension is less than β or the maximum standard deviation of an entry in the attribute/value probability table is greater than β/2 (β in the range [0,1]), then add merge(s,s') to CS_Temp and remove s and s' from CS_Temp.

Set CS=CS_Temp. Remove from RS all points that went into CS, (RS=RS−CS.) Note that the vectors Sum, Sumsq, values of M and the attribute/value probability tables for the CS newly-found CS elements were determined in the sub-clustering process or in the merge processes. Note that the function merge (s,s') simply computes the sufficient statistics for the subcluster summarizing the points in both s and s' (i.e. computes Sum, Sumsq, M, attribute value probabilities the sub-cluster consisting of points in s and s').

Adjusting the Cluster Number

As discussed above, the choice of the correct cluster number K can be very important in providing an accurate cluster model of the data. A processing step 115 in the FIG. 3 processing loop L may institute a change in the cluster number K. The data mining engine 12 implements such a change using one of a number of instantiations of a function KAdjust( ) the processing steps of one instantiation are outlined in the flow chart of FIG. 7. The process 115 evaluates a candidate set of cluster models and either chooses to maintain the cluster number K of the then current model or chooses a clustering model having a cluster number different from the cluster number of the then current model. The process 115 of FIG. 7 uses the data structures of FIGS. 6A–6D produced during the scalable clustering process for making this determination.

Figure 13:
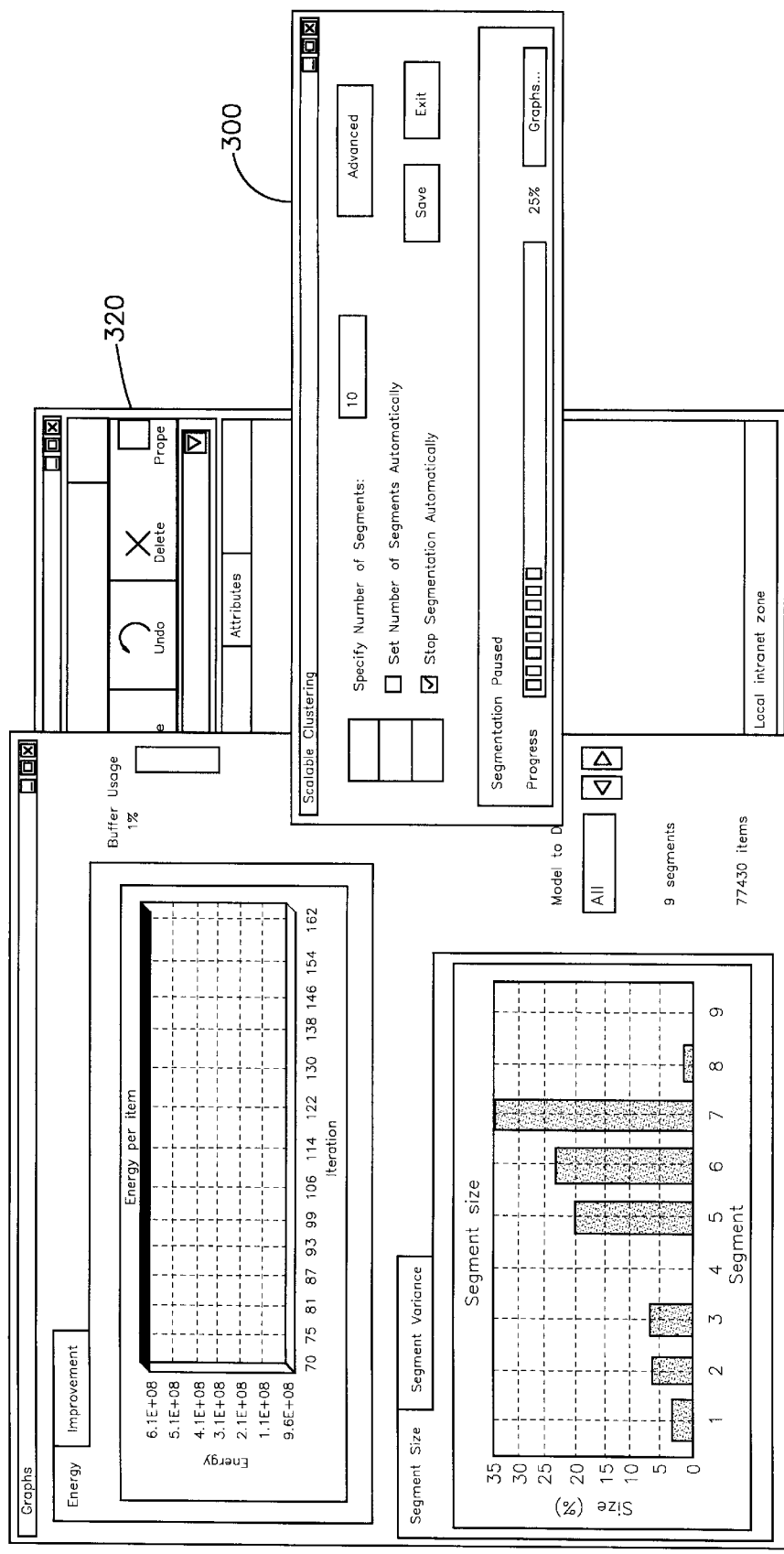
FIG. 13 is a depiction of a user interface showing a clustering procedure in progress that includes a user activated checkbox that causes a cluster number to be adjusted as clustering occurs.

FIG. 13 illustrates a user interface for display during a clustering process. Three over windows 300, 310, 320 are shown in the figure. A main window 320 is used to launch two child winds 310, 300 that update the user regarding the clustering process. Note that the window 300 has a checkbox option for choosing whether the clustering process should automatically adjust the cluster number and whether the clustering should be stopped based on a user defined criteria. If no cluster number adjustment takes place an initial cluster number is choosen and used during the entire clustering process. The window 310 contains two tabbed graph displays that illustrate the clustering process. This window is launched in response to a user clicking on a button in the control window 300.

Each of the alternate embodiments of the function discussed below uses a Monte Carlo Cross-Validation technique proposed in the paper entitled "Clustering using Monte Carlo Cross-Validation" to Smyth. *Proc. 2$^{nd}$ Int. Conf. Knowledge Discovery and Data Mining (KDD-96)*. Portland, Oreg., August 1996. AAAI Press, pp. 126–133. This paper is incorporated herein by reference.

Figure 4:
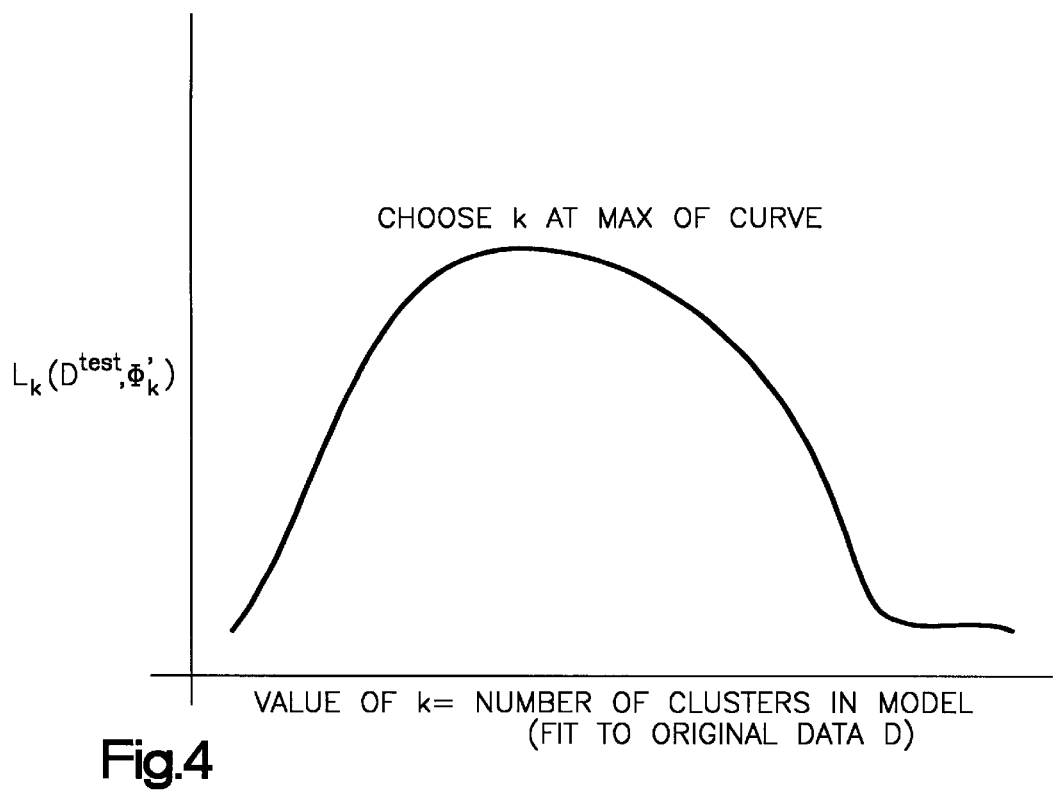
FIG. 4 is a graph showing a relationship between a test function evaluated over a clustering model for various number of clusters in the model.

This process assumes that one has clustering models with different values of K which are fitted to the dataset D. The function Kadjust( ) scores each of these models by computing a log-likelihood over a separate test dataset $D^{test}$. The model with the best score over the test data set is used to set the cluster number. FIG. 4 is a graph showing an exemplary test function used to score candidate cluster models as a function of K. The test function increases and then decreases with cluster number K and the disclosed process determines the K value that maximizes the test function.

Using the Smyth notation, it is assumed that the database data are generated by a linear combination of component density functions resulting in a mixture probability density function (such as the one dimensional situation in FIG. 5) of the form:

$$f_k(x \mid \Phi_k) = \sum_{j=1}^{k} \alpha_j g_j(x \mid \theta_j)$$

In this equation, x is a d dimensional feature vector X, k is the number of components in the model, $\theta_j$ are the parameters associated with the density component $g_j$, the $\alpha_j$ are the "weights" for each component j and $\Phi_k = \{\alpha_1 \ldots \alpha_k, \theta_1 \ldots \theta_k\}$ denotes the set peters for the overall model.

Log-Likelihood Calculations:

Let f(x) be the 'true' probability density function for x. Let $D = (x_1, x_2, \ldots, x_N)$ be random samples from the database. An exemplary embodiment fits a set of finite mixture models with k components to the dataset D, where k ranges from 1 to $k_{max}$. This is an indexed set of estimated models, $f_k(x \mid \Phi'_k)$, k=1, ..., $K_{max}$, where each $f_k(x \mid \Phi'_k)$ has been fitted to the dataset D.

The data log-likelihood for the k-th model is defined as:

$$L_k(D, \Phi'_k) = \log\left(\prod_{i=1}^{M} f_k(x_i \mid (\Phi'_k))\right) = \sum_{i=1}^{M} \log f_k(x_i \mid (\Phi'_k))$$

We assume that the parameters for the k-th mixture model were estimated by maximizing the likelihood as a function of $\Phi_k$, keeping the data D fixed (standard maximum likelihood estimation). $L_k(D, \Phi'_k)$ is a non-decreasing function of k since the increased flexibility or more mixture components allows a better fit to the data. The process uses a test data set $D^{test}$ which is not used in fitting any of the models. Let $Lk(D^{test}, \Phi_k)$ be the log-likelihood as defined above where $M_k$ indicates the parameters of model $M_k$, where the models are fit to the training data D but the likelihood is evaluated on $D^{test}$. We can view this likelihood as a function of the "parameter" K, keeping all other parameters and D fixed. Intuitively, this "test likelihood" should be a more useful estimator (than the training likelihood) for comparing mixture models with different numbers of components.

To employ the method of Smyth, the cluster model parameter values (i.e. means and covariances for Gaussian attributes and table of probabilities of attribute/values for discrete attributes), must be fit to the data. If one wishes to alter the value of K within the scalable clustering framework so as to maximize the log-likelihood test data score, one must have a model with altered k-value "fit" to the data. This is done by performing the extended EM clustering over the contents of the memory buffer (RS, CS, DS) for the altered K-value. Then after ExtendedEM has converged, the model with altered K-value on the test data, $D^{test}$ is scored.

The test data, $D^{test}$, may be obtained in two (or more) ways. The first is to set aside a static subset of data as $D^{test}$ and not alter it at all during execution of the scalable clustering algorithm. The second approach is to treat new data obtained from the database at each iteration of the scalable clustering algorithm as $D^{test}$. In either case, the set $D^{test}$ may be written to disk so not to utilize any of the pre-allocated RAM buffer. The computational burden of accessing this data from disk is small—a single sequential scan is needed to score a model. Multiple scans are not required to score a model.

FIG. 7 is a flowchart of one embodiment of the process 115 that updates the cluster number K. This process is performed subsequent to an initial clustering of data so that the data structures CS, RS, and DS are not null and in particular this process may increase a cluster number by one based on the contents of the CS data structures depicted in FIG. 6B.

The holdout test data set $D^{test}$ is identified from the data read from the database at the step 110 and the function Kadjust( ) 115 is called. At any given iteration of the loop L in FIG. 3, the MODEL of FIG. 6D includes K clusters. At a step 204 this model is evaluated to produce a log likelihood of the test set over the current model and we initialize the BestModel to be the current model and BestModelLogL to be the score of the current model over the test set. At step 206 an evaluation loop counter is initialized to the first (i=1) CS data structure in FIG. 6B. A cluster model is created at the step 208 like the data structure 6D except that the data structure has K+1 clusters wherein the starting point (SUM and SUMSQ vectors, value of M, and attribute/value probability table) for the additional cluster is chosen from the sufficient statistics of the first CS data structure $CS_1$. At the next step 210 the cluster model with K+1 clusters is used to cluster data summarized in the sufficient statistics of DS, CS and RS. The resulting model (FIG. 6D with K+1 rather than K clusters) is then used to determine the log likelihood of the data from the $D^{test}$ testset. The results of this evaluation are designated SCORE in the flow chart of FIG. 7.

The process of FIG. 7 loops through all possible CS data structures and scores the models Model(K+1)_i which are generated by appending CSi onto the current model. If one of these models has a better test-set score than BestModel, we set BestModel=Model(K+1)_i and BestModelLogl= score. When a positive branch 220 is taken the best model has been identified. The best model may indeed be the original model if none of the Model(K+1)_i score any better than the current model. The process of FIG. 7 tries all possible compressed clusters (CS) as candidate new clusters. Psuedo-code for the FIG. 7 process is listed in the appendix as listing 1.

Figure 9:
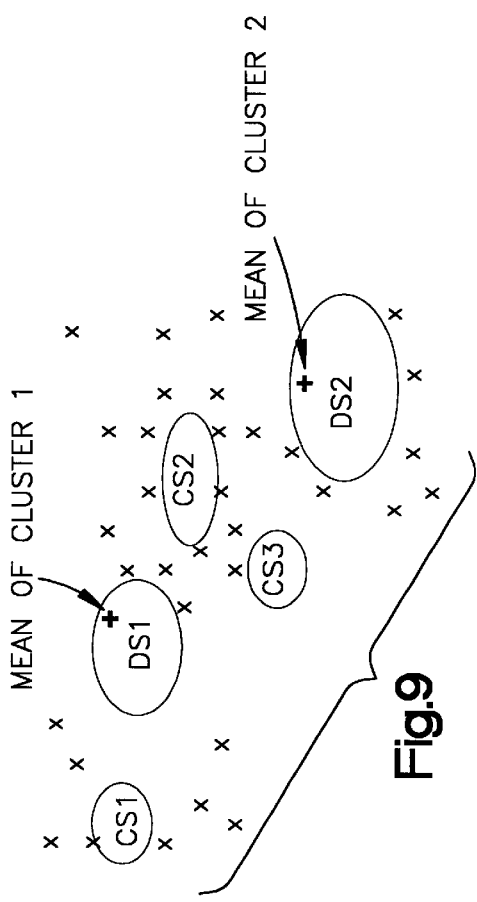
Figure 10:
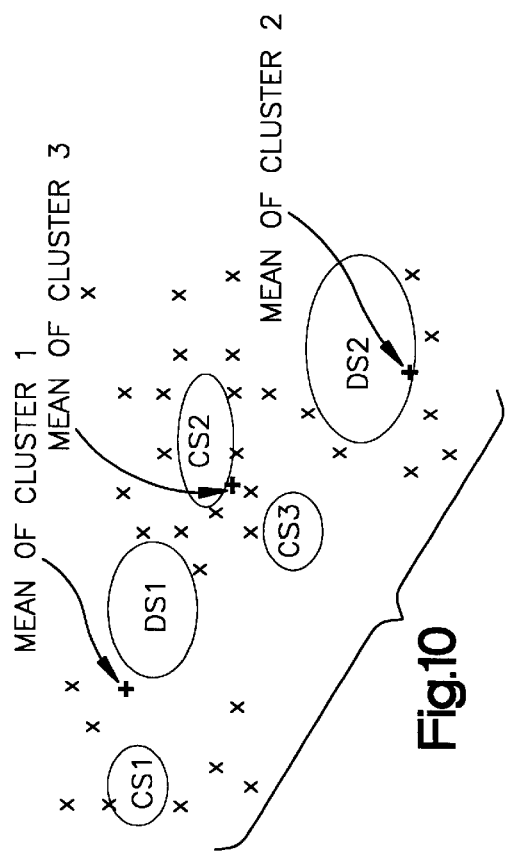

Now consider how the process outlined in FIG. 7 would work for the clustering models depicted in FIGS. 9 and 10. Note that for this example we are only considering 2 continuous database attributes, but the process works in general over n continuous attributes and d discrete attributes. In FIG. 9, data from a database 10 has been read into a memory of a computer and used to form a clustering model having two clusters designated "cluster 1" and "cluster 2". Turning to FIG. 6D, the current model has two clusters characterized by two data structures having 'SUM' and 'SUMSQ' vectors as well as a value for M and an attribute/ value probability table in the general case (in this example, since we are not considering discrete attributes, this table would be null). As the data structures are determined the other data structures in FIG. 6, i.e. structures 6A, 6B, and 6C are maintained in the computer memory. In FIG. 9 the means or centroids (SUM/M for a given cluster) are plotted for the two clusters. The two data structures DS (FIG. 6A) are represented as ovals. Three subclusters of the data structure CS are represented by the three ovals CS1, CS2, CS3 in the figure. Individual data points maintained the RS data structure (FIG. 6B) are represented by individual 'x' points on the FIG. 9 depiction.

FIG. 10 shows a two dimensional depiction of the same data clustering information with K=3. A new cluster is initialized using the mean of CS2 and then an extended EM clustering procedure is performed over the contents of the three data structures RS, CS and DS. Note the CS2 data structure in CS was used as a starting point for the extended clustering but after the memory contents are used to re-cluster using K=3 the mean of cluster 3 (the new cluster) has shifted from the center of the CS2 data structure.

FIGS. 9 and 10 depict two candidate cluster models, a current model having K=2 and a second cluster model with K=3. In accordance with the embodiment outlined in the flowchart of FIG. 7 all three CS subclusters were potential starting points for the K=3 cluster model. The result of re-clustering with the CS2 initialization is depicted.

Figure 11:
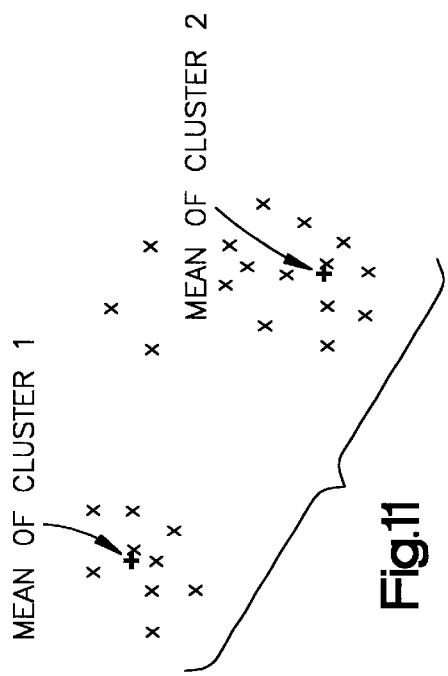
FIGS. 9–12 are representative two dimensional data plots showing application of the invention in determining cluster number.
Figure 12:
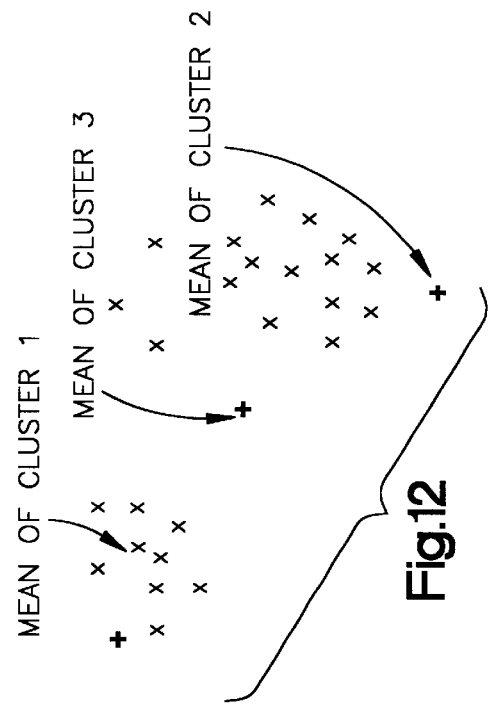

Turning to FIGS. 11 and 12 one sees individual data points (again represented as 'x's in those Figures) from the test or holdout set. Visually one can see that the test set fits the current model more accurately since there appears to be two clusters of the test data set and furthermore the mean or centroid of the two cluster from the existing model appear to fall within a region surrounded by the points from the holdout set.

The addition of a new cluster to K=3 is not guaranteed to make a better model. At the step 222 of the flowchart of FIG. 7 the test function over the candidate cluster model K=3 is compared with the test function over the same holdout data of the current model (K=2). If the existing model better models the data in the holdout set the current model is kept and used in the subsequent data clustering that is built from additional data read from the database 10.

Alternate Embodiment for Increasing K by More Than One

In accordance with a first alternate procedure for adjusting the cluster number, the number of cluster is increased by a positive integer greater than 1. In accordance with this procedure, the log likelihood scores are obtained for different combinations of c elements chosen from the C subclusters in CS. As combination of c CS elements is added to the current model and re-clustered via the ExtendedEM (or ExtendedK-Mean) procedures, it is scored on the test set. If the score is better than the best model score (initialized to the score of the current model), then we keep the new model with K+c clusters, otherwise we keep the best model seen so far. The combination of c subclusters from the data structure CS having the highest log likelihood score is chosen to augment the cluster number K to a new cluster model having K+c clusters. This first alternative process is summarized in listing 2 of the accompanying appendix.

Alternate Embodiment for Decreasing K by One

A second alternate embodiment of the present invention decreases the number of clusters instead of increasing the cluster number. Each of the clusters within the existing model is evaluated for removal from the clustering model. This is performed by removing the cluster from the existing model, reclustering and scoring the remaining model using the log likelihood scoring function. If a better score is achieved for a model having K−1 clusters than the score for the current model, the cluster number is decreased to K−1 clusters. Furthermore, in decreasing the cluster number the cluster is deleted that produces the best test over the holdout data. Conceivably more than one cluster model having a smaller cluster number will produce a better score than the score for the existing model having K clusters. Pseudo-code for this second alternate embodiment is found in the appendix as listing 3.

Alternate Embodiment for Decreasing K by More Than One

This embodiment of the invention decreases the cluster number by more than one cluster number. Let K' be the cluster number less than the existing cluster number for evaluation. This parameter may be user defined or derived from other parameter settings determined by the clustering algorithm. To decrease the cluster number by more than one the process appends together parameters from the existing model to use as a starting point for evaluation of the cluster model with K' clusters. The number of models to evaluate is the number of combination in which K elements can be organized into K' sets. The process of reclustering for each of these combinations is performed from the sufficient statistics in the computer memory and then this cluster model scored on the test or holdout set. If one of the models having K' clusters produces a better model (according to the log likelihood test over the test set) than the existing model having K clusters then the model with K' clusters is used to perform additional clustering of the database data. A pseudo-code listing of the process of this third alternative embodiment is found in the appendix as listing 4.

Alternate Embodiment Increasing K by 1 Based on Subcluster Size

An additional option for use in adjusting the cluster number K is to select one of the clusters in the datastructure CS based on the size of that subcluster. Referring to FIG. 6B, one sees that a number (float) M is assigned to each of the subclusters CS based on the data records contribution to that subcluster. This number is not an integer in the EM clustering process but instead is the summation on of the weighting factors of all data records read from the database to characterize the current model. In this fourth alternate embodiment the subcluster from CS having the largest size is chosen to evaluate the log likelihood over the test set and this value is compared with the log likelihood of the current model. The process of this fourth alternate embodiment is similar to the FIG. 7 process, but no looping over the multiple CS data structures is used. In the FIG. 9 illustration of the K=2 cluster model one sees that the subcluster CS2 is the largest subcluster. If the model using K+1 cluster produces the greater log likelihood over the test set then clustering continues with K+1 clusters. If it does not, then clustering continues with K clusters. A psuedo-code listing for this fourth alternate embodiment is presented in the appendix as listing 5.

Alternate Embodiment for Increasing K by More Than One Based on Subcluster Size

This alternate embodiment is similar to the fourth alternate, but instead of incrementing the cluster number by just one (K+1) a cluster number K' greater than K+1 is chosen for evaluation. Under this alternate embodiment the largest J=K'−K subclusters from the data structure CS are chosen to augment the model of FIG. 6D. The sufficient statistics from these K'−K subclusters are used as the starting point of the clusters added to the K clusters of the current model and a reclustering is performed using the then current sufficient statistics from the data structures RS, CS and DS in computer memory. Using the example of FIG. 9 if the the cluster CS3 had the second greatest size and the evaluation was for K=4, then the reclustering would be performed using K=4 with the starting points the existing two models of FIG. 6D and the sufficient statistics of the two CS subclusters CS2 and CS3. Psuedo-code for this embodiment is listed in the appendix as listing 6.

Alternate Embodiment for Decreasing K by 1 Based on Cluster Size

In this alternate embodiment the cluster number is decreased by one. In this process a cluster from the current model having the smallest weight (M) is removed as a cluster. Then the resulting model with K−1 clusters is used to recluster the data contained in the sufficient statistics in the computer memory. If the score for this model with cluster number K−1 is greater than the model with cluster number K then the cluster model with K−1 clusters is used for further clustering. Psuedo-code for the sixth alternate embodiment is listed in the appendix as listing 7.

Alternate Embodiment for Decreasing K by More Than One Based on Cluster Size

This embodiment is similar to the seventh alternate except that the cluster number is decreased by more than one. In accordance with this process the smallest c clusters are removed from the model of FIG. 6D. The sufficient statistics in memory are then used to cluster the candidate model having K−c clusters. The scores from the two alternate models are compared and further clustering is performed using the model with the best log likelihood score. Pseudo-code for this embodiment is in the appendix as listing 8.

Alternate Embodiment for Increasing K by 1 by Partitioning Test Set

FIG. 8 is a flowchart of an additional embodiment of a process for increasing the number of clusters K during the clustering process of FIG. 3. In this alternate embodiment a test set $D^{test}$ is gathered 250 from the database and the test set is split into two datasets. For each record in the data set, the log likelihood of the record for the K clusters in the current model is evaluated 252. If the log likelihood of the record exceeds a threshold value $\alpha$ then the data point is sufficiently summarized. If the log likelihood of the record is not sufficiently summarized, then the data record is added 254 to a buffer or list of such records. All records within the test set are evaluated and some of these records are placed in the buffer of not sufficiently summarized records. If the buffer of insufficient records is not of a size MinSetSize as determined at a step 256, then the present model is judged to be the better of the two models and clustering continues. If the size of the buffer exceeds the value of MinSetSize then one of the CS subclusters is used as a new cluster center and reclustering is performed. The values of $\alpha$ and MinSetSize could be user-defined, derived from other parameters required for the scalable clustering algorithm or dynamically set by the scalable clustering algorithm.

The CS element chosen to augment the number of clusters is that which best fits the subset of the test set not sufficiently summarized. Pseudo-for this alternate embodiment is contained in listing 9 of the appendix.

Alternate Embodiment for Increasing K by More Than 1 by Partitioning

This alternative embodiment adds CS elements as clusters to the clustering model of FIG. 6D until the size of the set of points not sufficiently summarized by the model becomes equal to or smaller than ((# of points in $D^{test}$(not suff))−a minimum Set Size), or the number of CS elements added is equal to c. This process is summarized in the pseudo-code listing of listing 10 in the appendix.

Alternate Embodiment for Decreasing K by on by Partitioning

This alternate embodiment decrease the number of clusters to by 1 as long as the size of the test set not sufficiently summarized by the resulting model is greater than or equal to size of test set minus the pre-defined minimum set size. Psuedo-code for this embodiment contained listing 11 of the appendix.

Alternate Embodiment K by More Than One by Partitioning

The last enumerated alternate embodiment for adjusting the cluster number will decrease the number of clusters by at most k'=(k−c))<k as long as the size of the test set not sufficiently summarized by the resulting model is greater than the size of the original test set minus the pre-defined minimum set size. Psuedo-code for this embodiment is contained in listing 12 of the appendix.

Stopping Criteria at Step 140

The scalable clustering analysis is stopped (rather than suspended) and a resultant model output produced when the test 140 of FIG. 3 indicates the Model is good enough. Two alternate stopping criteria (other than a scan of the entire database) are used.

A first stopping criteria defines a probability function p(x) to be the quantity $$p(x) = \sum_{l=1}^{K} \frac{M(l)}{N} (g(x|l))$$

where x is a data point or vector sampled from the database and 1) the quantity M(1) is the scalar weight for the 1th cluster, (The number of data elements from the database sampled so far represented by cluster 1) 2) N is the total number of data points or vectors sampled thus far, and 3) g(x|1) is the probability function for the data point for the 1th cluster. The value of g(x|1) is the product of the height of the Gaussian distribution for cluster 1 evaluated over the continuous attribute values times the product of the values of the attribute/value table associated with the 1th cluster taking the values of the attributes appearing in x.

Now define a function f(iter) that changes with each iteration.

$$f(iter) = \frac{1}{M} \sum_{i=1}^{M} \log p(x_i)$$

The summation in the function is over all data points and there includes the subclusters in the data structure CS, the summarized data in DS and individual data points in RS. Consider two-computations during two successive processing loops of the FIG. 3 scalable clustering analysis. Designate the calculations for these two iterations as $f_z$ and $f_{z-1}$. Then a difference parameter is defined as $d_z=f_z-f_{z-1}$. Evaluate the maximum difference parameter over the last r iterations and if no difference exceeds a stopping tolerance ST then the first stopping criteria has been satisfied and the model is output.

In accordance with a second stopping criteria, each time the Model is updated K cluster means and covariance matrices are determined and the attribute/value probability tables for the cluster are updated. The two variables CV_dist and mean_dist are initialized. For each cluster the newly determined covariance matrix and mean are compared with a previous iteration for these parameters. A distance from the old mean and the new mean as well as a distance between the new and old covariance matrices is determined. These values are totaled for all the clusters:

For 1=1, . . . ,k
[New_Mean, New_CVMatrix]ConvertSuffStats(
New_Model(1).SUM, New_model(1).SUMSQ,
New_Model(1).M_1);
    mean_dist=mean_dist+distance(Old$_{13}$ SuffStats
(1).Mean,New_mean);
CVDist=CV_dist+distance(Old_SuffStats
(1).CVMatrix,
New_CVMatrix);
Ptable_dist=Ptable_dist+distance(Old_Model
(1).Attribute_Value_Table, New_model(1)
.Attribute_Value_Table).
End for The stopping criteria determines whether the sum of these two numbers multiplied by a factor from the change in discrete component probability is less than a stopping criteria value:

[(1/(3*k))*(mean_dist+CV_dist+Ptable_dist)]<stop_tol

Computer System

With reference to FIG. 1 an exemplary data processing system for practicing the disclosed data mining engine invention includes a general purpose computing device in the form of a conventional computer 20, including one or more processing units 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures.

The system memory includes read only memory (ROM) 24 and random access memory (RAM) 25. A basic input/output system 26 (BIOS), containing the basic routines that help to transfer information between elements within the computer 20, such as during start-up, is stored in ROM 24.

The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage of computer readable instructions, data structures, program modules and other data for the computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROM), and the like, may also be used in the exemplary operating environment.

A number of program modules may be stored on the hard disk, magnetic disk 29, optical disk 31, ROM 24 or RAM 25, including an operating system 35, one or more applications programs 36, other program modules 37, and program data 38. A user may enter commands and information into the computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, personal computers typically include other peripheral output devices (not shown), such as speakers and printers.

The computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the computer 20 is connected to the local network 51 through a network interface or adapter 53. When used in a WAN networking environment, the computer 20 typically includes a modem 54 or other means for establishing comunications over the wide area network 52, such as the Internet. The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used.

While the present invention has been described with a degree of particularity, it is the intent that the invention include all modifications and alterations from the disclosed implementations falling within the spirit or scope of the appended claims.

APPENDIX

Listing 1 (Increment k by 1 by refitting each CS element separately to data and score):
1. Set BestModel=CurrentModel, BestModelLogl=log-likelihood of current clustering model produced by scalable clustering algorithm over test set $D^{test}$.
2. For each $CS_i$ in CS,
   a. Append the parameter values from $CS_i$ to those of the current model. This produces an initial model for ExtendedEM/Extended_KMean clustering with k+1 cluster.
   b. Run ExtendedEM/Extended_KMean on the contents of the buffer (RS, CS, DS) using the initial point constructed in 3.1.
   c. Score this model with k+1 clusters by computing the log-likelihood over the set $D^{test}$ as described in [Smyth, 1996].
   d. If (BestModelLogl<Score [computed in 3.3]) then
      i. BestModelLogl=Score
      ii. BestModel=clustering model with k+1 clusters computed in 3.2.
3. Return BestModel Listing 2 (Incrementing k to k'=k+c by refitting CS elements and scoring):
NOTE: k'=k+c>k
NOTE: k' is a parameter to this method—may be user-defined, derived from other parameter settings, or altered by the scalable clustering algorithm.
1. Set BestModel=CurrentModel, BestModelLogl=log-likelihood of current clustering model produced by scalable clustering algorithm over test set $D^{test}$.
2. For each subset of c elements of CS,
   a. Append the parameter values from the subset of CS to those of the current model. This produces an initial model for ExtendedEM/Extended_KMean clustering with k+c clusters.
   b. Run ExtedendEM/Extended_KMean on the contents of the buffer (RS, CS, DS) using the initial point constructed in 3.1.
   c. Score this model with k+c clusters by computing the log-likelihood over the set $D^{test}$ as described in [Smyth, 1996].
   d. If(BestModeLogl<Score [computed in 3.3]) then
      i. BestModelLogl=Score
      ii. BestModel=clustering model with k+c clusters computed in 3.2.
3. Return BestModel.

Listing 3 (Decrementing k by 1 by refitting each CS element separately to data and score):
1. Set BestModel=CurrentModel, BestModelLogl=log-likelihood of current clustering model produced by scalable clustering algorithm over test set $D^{test}$.
2. For each model component (cluster) in CurrentModel,
   a. Remove the parameter values corresponding to this model component (cluster) from the CurrentModel. This produces an initial point for ExtendedEM/Extended_KMean clustering with k−1 clusters.
   b. Run ExtedendEM/Extended_KMean on the contents of the buffer (RS, CS, DS) using the initial point constructed in 3.1.
   c. Score this model with k−1 clusters by computing the log-likelihood over the set $D^{test}$.
   d. If (BestModelLogl<Score [computed in 3.3]) then
      iii. BestModelLogl=Score
      iv. BestModel=clustering model with k−1 clusters computed in 3.2.
3. Return BestModel.

Listing 4 (Decrementing k to k'=k−c by refitting CS elements and scoring):
NOTE: that k'=(k−c)<k.
NOTE: k' is a parameter to this method—may be user-defined or derived from other parameter settings or altered by the scalable clustering algorithm.
1. Set BestModel=CurrentModel, BestModelLogl=log-likelihood of current clustering model produced by scalable clustering algorithm over test set $D^{test}$.
2. For each set of k' clusters from original k in cluster model,
   a. Remove the parameter values corresponding to the chosen k' clusters from the CurrentModel. This produces an initial point for ExtendedEM/Extended_KMean clustering with k' clusters.
   b. Run ExtendedEM/Extended_KMean on the contents of the buffer (RS, CS, DS) using the initial point constructed in 3.1.
   c. Score this model with k' clusters by computing the log-likelihood over the set $D^{test}$.
   d. If(BestModelLogl<Score [computed in 3.3]) then
      v. BestModelLogl=Score
      vi. BestModel=clustering model with k' clusters computed in 3.2.
3. Return BestModel.

Listing 5 (Increment k by 1 by choosing largest CS element):
1. Set CurrentModel=model currently computed by scalable clustering algorithm. Set CurrentModelLogLikelihood=log-likelihood of current clustering model produced by scalable clustering algorithm over test set $D^{test}$.

2. Append parameter values for CS element having largest weight (having the most points) to the parameter values computed by the scalable clustering algorithm. This produces an initial point for ExtendedEM/Extended_KMean clustering with k+1 clusters.
3. Run ExtendedEM/Extended_KMean on the contents of the buffer (RS, CS, DS) using the initial point constructed in 2.
4. Score this model with k+1 clusters by computing the log-likelihood over the set $D^{test}$.
5. If(Score [computed in 4.]>CurrentModelLogLikelihood) then
   5.1 Set CurrentModel=model computed in 3 and continue with scalable clustering using newly computed model with k+1 clusters.

Listing 6 (Increment k to k'=k+c (incrementing by more than 1) by choosing corresponding largest CS elements):
NOTE: k'=(k+c)>k.
NOTE: k' is a parameter to this method—may be user-defined or derived from other parameter settings or altered by the scalable clustering algorithm.
1. Set CurrentModel=model currently computed by scalable clustering algorithm. Set CurrentModelLogLikelihood=log-likelihood of current clustering model produced by scalable clustering algorithm over test set $D^{test}$.
2. Append parameter values from the c CS elements having largest weight (having most points assigned to them) to the parameter values computed by the scalable clustering algorithm. This produces an initial point for ExtendedEM/Extended_KMean clustering with k'=k+c clusters.
3. Run ExtendedEM/Extended_KMean on the contents of the buffer (RS, CS, DS) using the initial point constructed in 2.
4. Score this model with k' clusters by computing the log-likelihood over the set $D^{test}$.
5. If (Score [computed in 4.]>CurrentModelLogLikelihood) then
   5.1 Set CurrentModel=model computed in 3 and continue with scalable clustering using newly computed model with k' clusters.

Listing 7 (Decrementing k by 1 by removing smallest cluster in current model):
1. Set CurrentModel=model currently computed by scalable clustering algorithm. Set CurrentModelLogLikelihood=log-likelihood of current clustering model produced by scalable clustering algorithm over test set $D^{test}$.
2. Remove parameter values from current clustering model corresponding to the cluster with smallest weight (having the fewest points). This produces an initial point for ExtendedEM/Extended_KMean clustering k-1 clusters.
3. Run ExtendedEM/Extended_KMean on the contents of the buffer (RS, CS, DS) using the initial point constructed in 2.
4. Score this model with k-1 clusters by computing the log-likelihood over the set $D^{test}$.
5. If (Score [computed in 4.]>CurrentModelLogLikelihood) then
   5.1 Set CurrentModel=model computed in 3 and continue with scalable clustering using newly computed model with k-1 clusters.

Listing 8 (Decrementing k to k'=k-c by removing smallest c clusters in current model):
NOTE: that k'=(k-c)<k.
NOTE : k' is a parameter to this method—may be user-defined or derived from other parameter settings or altered by the scalable clustering algorithm.
1. Set CurrentModel=model currently computed by scalable clustering algorithm. Set CurrentModelLogLikelihood=log-likelihood of current clustering model produced by scalable clustering algorithm over test set $D^{test}$.
2. Remove parameter values from current clustering model corresponding to the c clusters with smallest weight (having the fewest points). This produces an initial point for ExtendedEM/Extended_KMean clustering with k' clusters.
3. Run ExtendedEM/Extended_KMean on the contents of the buffer (RS, CS, DS) using the initial point constructed in 2.
4. Score this model with k' clusters by computing the log-likelihood over the set $D^{test}$.
5. If (Score [computed in 4.]>CurrentModelLogLikelihood) then
   5.1 Set CurrentModel=model computed in 3 and continue with scalable clustering using newly computed model with k' clusters.

Listing 9 (Incrementing k by 1 by choosing CS element best fitting residual test points):
1. Partition $D^{test}$ into 2 subsets: 1 subset consists of points which are sufficiently summarized by the current model, the other subset consists of point of $D^{test}$ not sufficiently summarized by the current model.
   1.1 Set $D^{test}$(suff)=empty, $D^{test}$(not suff)=empty.
   1.2 Determine subsets as follows: for each data point x in $D^{test}$:
      1.2.1 Compute the likelihood of x in the current model.
      1.2.2 If (likelihood>α) then
         1.2.2.1 The data point is sufficiently summarized, place x in $D^{test}$(suff).
      1.2.3 If (Likelihood<=α) then
         1.2.3.1 The data point is not sufficiently summarized, place x in $D^{test}$(not suff).
2. If (the number of points in $D^{test}$(not suff)<MinSetSize) then
   2.1 Continue scalable clustering algorithm with current model or consider decrementing k by 1 or more.
3. If (the number of points in $D^{test}$(not suff)>=MinSetSize) then,
   3.1 Set MaxCSElement=null. Set MaxCSLikelihood=-infinity.
   3.2 For each $CS_i$ in CS,
      3.2.1 Set CSLikelihood=likelihood of $CS_i$ over $D^{test}$ (not suff).
      3.2.2 If (CSLikelihood>MaxCSLikelihood) then
         3.2.2.1 MaxCSLikelihood=CSLikelihood.
         3.2.2.2 MaxCSElement=$CS_i$.
   3.3 Append parameter values from MaxCSElement onto current clustering model. This increments k by 1 and continue scalable clustering.

Listing 10 (Incrementing k to at most k'=k+c by choosing CS elements best fitting residual test points):
NOTE: k'=k+c>k.
NOTE: k' is a parameter to this method—may be user-defined or derived from other parameter settings or altered by the scalable clustering algorithm.

1. Partition $D^{test}$ into 2 subsets: 1 subset consists of points which are sufficiently summarized by the current model, the other subset consists of point of $D^{test}$ not sufficiently summarized by the current model.
    1.1 Set $D^{test}$(suff)=empty, $D^{test}$(not suff)=empty.
    1.2 Determine subsets as follows: for each data point x in $D^{test}$:
        1.2.1 Compute the likelihood of x in the current model.
        1.2.2 If (likelihood>α) then
            1.2.2.1 The data point is sufficiently summarized, place x in $D^{test}$(suff).
        1.2.3 If (likelihood<=α) then
            1.2.3.1 The data point is not sufficiently summarized, place x in $D^{test}$(not suff).
2. If (the number of points in $D^{test}$(not suff)<MinSetSize) then,
    2.1 continue scalable clustering algorithm with current clustering model or consider decrementing k by 1 or more.
3. If (the number of points in $D^{test}$(not suff)>=MinSetSize) then,
    3.1 Assign the data in $D^{test}$(not suff) to each of the CS elements.
    3.2 Sort CS elements by the number of data points in $D^{test}$(not suff) assigned to them. Sort in descending order (largest CS elements first). Call the sorted list CSSortList.
    3.3 Set done=false. Set PointsToSummarize=((# of points in $D^{test}$(not suff))-MinSetSize). Set PointsSummarized=0. Set CSIndex=1. Set CSChosen=Null.
    3.4 While (not done)
        3.4.1 Append CS element in position CSIndex from CSSortList onto CSChosen.
        3.4.2 Set PointsSummarized=PointsSummarized+(# is assigned to CS element chosen in 3.4.1).
        3.4.3 If PointsSummarized>=PointsToSummarize) OR (CSIndex=c) then
            3.4.3.1 Done=true
        3.4.4 Else
            3.4.4.1 CSIndex=CSIndex+1
    3.5 Append parameter values from these CS elements in CSChosen onto current clustering model producing augmented clustering model with at most k'=(k+c)>k clusters. The model will have fewer than k' clusters if fewer than c CS elements are needed to summarize the number of points in $D^{test}$(not suff)-MinSetSize.

Listing 11. (Decrementing k by 1 by removing cluster from current model summarizing fewest test points):

1. Partition $D^{test}$ into 2 subsets: 1 subset consists of points which are sufficiently summarized by the current model, the other subset consists of point of $D^{test}$ not sufficiently summarized by the current model.
    1.1 Set $D^{test}$(suff)=empty, $D^{test}$(not suff)=empty.
    1.2 Determine subsets as follows: for each data point x in $D^{test}$.
        1.2.1 Compute the likelihood of x in the current model.
        1.2.2 If (likelihood>α) then
            1.2.2.1 The data point is sufficiently summarized, place x in $D^{test}$(suff).
        1.2.3 If (likelihood<=α) then
            1.2.3.1 The data point is not sufficiently summarized, place x in $D^{test}$(not suff).
2. If (# of points in $D^{test}$(suff)<(# of points in $D^{test}$-MinSetSize)) then,
    2.1 Continue scalable clustering algorithm with current model or consider incrementing k by 1 or more.
3. If (# of points in $D^{test}$(suff)>=(# of points in $D^{test}$-MinSetSize)) then,
    3.1 Assign points in $D^{test}$(suff) to the current model clusters.
    3.2 Rank the current model clusters by the number of data points from $D^{test}$(suff) assigned to them.
    3.3 If (# of points assigned to the smallest cluster is<=MinSetSize) then
        3.3.1 Remove parameters corresponding to this smallest cluster from current model. This produces a clustering model with k-1 clusters. Continue scalable clustering algorithm with this model with k-1 clusters.
    3.4 Else
        3.4.1 Continue scalable clustering algorithm with current model with k clusters.

Listing 12 (Decrementing k by at most k'=k-c by removing clusters contributing least to summarization of test set):

NOTE: k'<k.
NOTE: k' is a parameter to this method—may be user-defined or derived from other parameter settings or altered by the scalable clustering algorithm.

1. Partition $D^{test}$ into 2 subsets: 1 subset consists of points which are sufficiently summarized by the current model, the other subset consists of point of $D^{test}$ not sufficiently summarized by the current model.
    1.1 Set $D^{test}$(suff)=empty, $D^{test}$(not suff)=empty.
    1.2 Determine subset as follows: for each data point x in $D^{test}$:
        1.2.1 Compute the likelihood of x in the current model.
        1.2.2 If (likelihood>α) then
            1.2.2.1 The data point is sufficiently summarized, place x in $D^{test}$(suff).
        1.2.3 If (likelihood<=α) then
            1.2.3.1 The data point is not sufficiently summarized, place x in $D^{test}$(not suff).
2. If ((# of points in $D^{test}$(suff)<(# of points in $D^{test}$-MinSetSize)) then,
    2.1 continue scalable clustering algorithm with current clustering model or consider incrementing k by 1 or more.
3. If ((# of points $D^{test}$(suff)>=(# of points in $D^{test}$-MinSetSize)) then,
    3.1 Assign the data in $D^{test}$(suff) to each of the clusters in the current model.
    3.2 Sort clusters by the number of data points in $D^{test}$(suff) assigned to them. Sort in ascending order (smallest cluster first). Call the sorted list ClusterSortList.
    3.3 Set done=false. Set PointsToNotSummarize=(# of points in $D^{test}$-MinSetSize). Set PointsNotSummarized=0. Set ClusterIndex=1. Set ClusterRemove=Null.
    3.4 While (not done)
        3.4.1 Append cluster in position ClusterIndex from ClusterSorList onto ClusterRemove.
        3.4.2 Set PointsNotSummarized=PointsNotSummarized+(# points assigned to cluster element chosen in 3.4.1).

3.4.3 If (PointsNotSummarized>= PointsToNotSummarize) OR (ClusterIndex=c) then 3.4.3.1 Done=true 3.4.4 Else 3.4.4.1 ClusterIndex=ClusterIndex+1

3.5 Remove parameter values from current model corresponding to elements in cluster remove producing reduced clustering model.

We claim:

1. In a computer system, a method for characterizing data into clusters comprising the steps of:
   a) providing a candidate cluster set for characterizing a database of data stored on a storage medium, wherein the candidate cluster set includes two or more clustering models having a different number of cluster in their clustering model;
   b) reading a data portion from the database and determining how the data portion fits clustering model within the candidate cluster set;
   c) choosing a best fit of the data portion to determine a selected clustering model from the candidate cluster set and then using the cluster number of said selected clustering model to update the selected clustering model using data portions from the database; and
   d) updating the clustering model using newly sampled data from the database until a specified clustering criteria has been satisfied.

2. The process of claim 1 wherein if a change in cluster number is made during the step of choosing a best fit the change is to a clustering model having a larger cluster number.

3. The method of claim 1 wherein the step of reading data includes the substep of maintaining a holdout data set from the data gathered from the database for use in choosing the best fit.

4. The method of claim 1 wherein said updating step maintains a data structure that contains compressed data that defines multiple data subclusters different from the K clusters in a current clustering model and wherein the step of providing a candidate set of cluster models adds one or more subclusters as additional clusters to a current clustering model.

5. The method of claim 4 wherein the candidate set of cluster models is chosen from a multiple number of subclusters organized according to size for determining which of said one or more subclusters are added as clusters to a current clustering model.

6. The method of claim 4 wherein each of the multiple data subclusters is evaluated in sequence as a candidate additional cluster in the current clustering model.

7. The method of claim 6 additionally comprising the step of maintaining a buffer of sufficient statistics and wherein each subcluster is added to a current clustering model to form a candidate clustering model and wherein the sufficient statistics are then used to update the candidate clustering model, said updated candidate clustering model then compared with the current clustering model to choose the best fit.

8. The method of claim 7 wherein the step of comparing is performed by fitting a test set of data from the database that is used to score the current clustering model and the updated candidate clustering model.

9. The method of claim 8 wherein the step of fitting the test data is performed by evaluating the log likelihood of the test data over a function representing the candidate cluster models.

10. The method of claim 1 additionally comprising the step of maintaining a buffer of sufficient statistics representing data from the database used in creating a current clustering model and wherein clusters that make up a current clustering model are evaluated as candidate clusters for removal from the current clustering model to reduce the cluster number by removing each candidate cluster and reclustering the reduced cluster number candidate clustering model using the sufficient statistics from the buffer and comparing the current clustering model to the candidate clustering model having a reduced cluster number.

11. The method of claim 1 wherein the step of determining to update the clustering number is based on evaluating a holdout set to determine if a sufficient number of records in the holdout set are accurately modeled by the current model.

12. The method of claim 6 additionally comprising the step of maintaining a buffer of sufficient statistics that includes sufficient statistics for a plurality of subclusters and wherein the cluster number is increased by adding clusters corresponding to the subclusters until a sufficient percentage of the test set data points are sufficiently characterized by the model having a larger cluster number.

13. The method of claim 4 wherein the candidate set of cluster models is chosen based on K cluster model functions and c additional cluster model functions.

14. The method of claim 6 wherein one or more of the cluster models in the candidate set has a cluster number less than K.

15. The method of claim 1 wherein the step of updating the cluster model is performed using an expectation maximization clustering process.

16. The method of claim 1 wherein the step of evaluating the candidate set containing two or more clustering models is performed each time data is obtained from the database.

17. A computer readable medium having stored thereon a data structure, comprising:
   a) a first storage portion for storing a data clustering model from data gathered from a database; said clustering model including a number of model summaries equal to a cluster number wherein a model summary for a given cluster comprises a summation of weighting factors from multiple data records;
   b) a second storage portion for storing sufficient statistics of at least some of the data records obtained from the database;
   c) a third storage portion containing individual data records obtained from the database for use with the sufficient statistics in deter said clustering model; and
   d) said third storage portion including a holdout data portion for use in evaluating the sufficiency of the cluster model and adjusting the cluster number of said model.

18. The computer readable medium of claim 17 additionally comprising an additional storage medium for storing data records for access by a computer processing unit for allows the data records in the additional storage medium to brought into the third storage portion and then rewritten to the additional storage medium for sequential access.

19. In a computer data mining system, apparatus for evaluating data in a database comprising:
   a) one or more data storage devices for storing a database of records on a storage medium;
   b) a computer having an interface to the storage devices for reading data from the storage medium and bring the data into a rapid access memory for subsequent evaluation; and
   c) said computer comprising a processing unit for evaluating at least some of the data in the database and for characterizing the data into multiple numbers of data clusters; said processing unit programmed to retrieve data records from the database into the rapid access memory, evaluate the data records contribution to the multiple number of data clusters based upon an existing data model, and then summarize at least some of the data before retrieving additional data from the database to build a cluster model from the retrieved data, d) wherein said processing unit comprises means for maintaining a data structure that contains DS, CS, and RS data and further wherein the processing unit comprises means for choosing a cluster number K from data in the DS, CS and RS data structures and providing a cluster model based on the chosen cluster number.

20. In a computer system, apparatus for characterizing data into clusters comprising the steps of:

a) means for providing a candidate cluster set for characterizing a database of data stored on a storage medium, wherein the candidate cluster set includes two or more clustering models having a different number of clusters in their clustering model;

b) means for reading a data portion from the database and determining how the data portion fits clustering models within the candidate cluster set;

c) means for choosing a best fit of the data portion to determine a clustering model from the candidate cluster set and then using the cluster number of said selected clustering model to update the selected clustering model using data portions from the database; and d) means for updating the clustering model using newly sampled data from the database until a specified clustering criteria has been satisfied.

21. The apparatus of claim 20 additionally comprising means for maintaining a buffer of sufficient statistics representing data from the database used in creating a current clustering model and wherein clusters that make up a current clustering model are evaluated as candidate clusters for removal from the current clustering model to reduce the cluster number by removing each candidate cluster and reclustering the reduced cluster number candidate clustering model using the sufficient statistics from the buffer and comparing the current clustering model to the candidate clustering model having a reduced cluster number.

22. The apparatus of claim 20 additionally comprising means for maintaining a buffer of sufficient statistics representing data from the database used in creating a current clustering model including a plurality of subclusters not included in the clusters of an existing clustering model and wherein clusters said plurality of subclusters are evaluated as candidate clusters for addition to the current clustering model to increase the cluster number by adding candidate subclusters and reclustering the increased cluster number candidate clustering model using the sufficient statistics from the buffer and comparing the current clustering model to the candidate clustering model having an increased cluster number.

23. A computer readable medium having computer-executable instructions for performing steps comprising:

a) providing a candidate cluster set for characterizing a database of data stored on a storage medium, wherein the candidate cluster set includes two or more clustering models having a different number of clusters in their clustering model;

b) reading a data portion from the database and determining how the data portion fits clustering models within the candidate cluster set;

c) choosing a best fit of the data portion to determine a selected clustering model from the candidate cluster set and then using the cluster number of said selected clustering model to update the selected clustering model using data portions from the database; and d) updating the clustering model using newly sampled data from the database until a specified clustering criteria has been satisfied.

24. The computer readable medium of claim 23 wherein the step of reading data includes the substep of maintaining a holdout data set from the data gathered from the database for use in choosing the best fit.

25. The computer readable medium of claim 23 wherein said updating step maintains a data structure that contains compressed data that defines multiple data subclusters different from the K clusters in a current clustering model and wherein the step of providing a candidate set of cluster models adds one or more subclusters as additional clusters to a current clustering model.

26. The computer readable medium of claim 25 wherein the candidate set of cluster models is chosen from a multiple number of subclusters organized according to size for determining which of said one or more subclusters are added as clusters to a current clustering model.

27. The computer readable medium of claim 26 additionally comprising the step of maintaining a buffer of sufficient statistics and wherein each subcluster is added to a current clustering model to form a candidate clustering model and wherein the sufficient statistics are then used to update the candidate cluster model, said updated candidate clustering model then compared with the current clustering model to choose the best fit.

28. The computer readable medium of claim 27 wherein the step of comparing is performed by fitting a test set of data from the database that is used to score the current clustering model and the updated candidate clustering model.

29. The computer readable medium of claim 28 wherein the step of fitting the test data is performed by evaluating the log likelihood of the test data over a function representing the candidate cluster models.

30. The computer readable medium of claim 23 additionally comprising the step of maintaining a buffer of sufficient statistics representing data from the database used in creating a current clustering model and wherein clusters that make up a current clustering model are evaluated as candidate clusters for removal from the current clustering model to reduce the cluster number by removing each candidate cluster and reclustering the reduced cluster number candidate clustering model using the sufficient statistics from the buffer and comparing the current clustering model to the candidate clustering model having a reduced cluster number.

* * * * *